(12) United States Patent
Kainuma

(10) Patent No.: US 11,470,269 B2
(45) Date of Patent: Oct. 11, 2022

(54) SOLID-STATE IMAGING DEVICE AND ELECTRONIC DEVICE EQUIPPED WITH SOLID-STATE IMAGING DEVICE

(71) Applicant: SONY SEMICONDUCTOR SOLUTIONS CORPORATION, Kanagawa (JP)

(72) Inventor: Toshiki Kainuma, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/056,650

(22) PCT Filed: Mar. 12, 2019

(86) PCT No.: PCT/JP2019/009999
§ 371 (c)(1),
(2) Date: Nov. 18, 2020

(87) PCT Pub. No.: WO2019/225122
PCT Pub. Date: Nov. 28, 2019

(65) Prior Publication Data
US 2021/0211591 A1 Jul. 8, 2021

(30) Foreign Application Priority Data
May 25, 2018 (JP) .............................. JP2018-100799

(51) Int. Cl.
*H04N 5/345* (2011.01)
*H04N 5/3745* (2011.01)
*H04N 5/378* (2011.01)

(52) U.S. Cl.
CPC ............. *H04N 5/345* (2013.01); *H04N 5/378* (2013.01); *H04N 5/37455* (2013.01)

(58) Field of Classification Search
CPC .... H04N 5/345; H04N 5/37455; H04N 5/378; H04N 5/3454; H04N 5/376
See application file for complete search history.

(56) References Cited

U.S. PATENT DOCUMENTS

| 2001/0005226 | A1* | 6/2001 | Muramatsu | ............ H04N 5/361 348/304 |
| 2005/0094012 | A1* | 5/2005 | Gomi | ................... H04N 5/3456 348/308 |

(Continued)

FOREIGN PATENT DOCUMENTS

| CN | 103051846 A | 4/2013 |
| CN | 103051847 A | 4/2013 |

(Continued)

OTHER PUBLICATIONS

International Search Report and Written Opinion of PCT Application No. PCT/JP2019/009999, dated Jun. 18, 2019, 08 pages of ISRWO.

(Continued)

*Primary Examiner* — Nhan T Tran
(74) *Attorney, Agent, or Firm* — Chip Law Group

(57) ABSTRACT

Provided is a solid-state imaging device including a pixel array in which a plurality of pixels is two-dimensionally arrayed in a row direction and a column direction, and a control unit that sets a range to output pixel signals of the plurality of pixels in the pixel array to each of the row direction and the column direction. The solid-state imaging device further includes a vertical scanning unit that outputs the pixel signals of the plurality of pixels in the range in the column direction set by the control unit, for each row and in the column direction, and a column A/D converter that converts the pixel signals of the plurality of pixels in the range in the row direction set by the control unit from analog (Continued)

signals into digital signals, for each column and in the row direction.

11 Claims, 31 Drawing Sheets

(56) References Cited

U.S. PATENT DOCUMENTS

| | | | |
|---|---|---|---|
| 2009/0021621 A1* | 1/2009 | Hashimoto | H04N 5/3456 |
| | | | 348/300 |
| 2012/0105665 A1* | 5/2012 | Matsumoto | H04N 5/23245 |
| | | | 348/222.1 |
| 2013/0087683 A1 | 4/2013 | Mo et al. | |
| 2013/0088624 A1 | 4/2013 | Mo et al. | |
| 2013/0089175 A1 | 4/2013 | Mo et al. | |
| 2013/0308031 A1 | 11/2013 | Theuwissen | |
| 2014/0160334 A1 | 6/2014 | Wakabayashi | |
| 2015/0281616 A1* | 10/2015 | Muto | H04N 5/378 |
| | | | 348/322 |
| 2017/0163920 A1* | 6/2017 | Hwang | H01L 27/14612 |
| 2017/0195603 A1* | 7/2017 | Kawazu | H04N 5/341 |
| 2019/0349546 A1 | 11/2019 | Hwang et al. | |
| 2020/0014874 A1 | 1/2020 | Kawazu et al. | |
| 2020/0092501 A1* | 3/2020 | Li | H04N 5/23227 |
| 2020/0154071 A1 | 5/2020 | Hwang et al. | |

FOREIGN PATENT DOCUMENTS

| | | | | |
|---|---|---|---|---|
| CN | 103051850 | A | 4/2013 | |
| CN | 103782587 | A | 5/2014 | |
| CN | 106031162 | A | 10/2016 | |
| CN | 106851142 | A | 6/2017 | |
| CN | 108234906 | A | 6/2018 | |
| CN | 110312087 | A | 10/2019 | |
| DE | 102011085427 | A1 | 5/2012 | |
| EP | 2665257 | A1 * | 11/2013 | H04N 5/3454 |
| EP | 2665257 | A1 | 11/2013 | |
| EP | 2755379 | A1 | 7/2014 | |
| EP | 3116217 | A1 | 1/2017 | |
| EP | 3474542 | A1 | 4/2019 | |
| JP | 2012-099909 | A | 5/2012 | |
| JP | 2013-046232 | A | 3/2013 | |
| JP | 5862126 | B2 | 2/2016 | |
| JP | 2020-141405 | A | 9/2020 | |
| KR | 10-2014-0071332 | A | 6/2014 | |
| KR | 10-2016-0129844 | A | 11/2016 | |
| KR | 10-2017-0065730 | A | 6/2017 | |
| KR | 10-2018-0129979 | A | 12/2018 | |
| KR | 10-2019-0053283 | A | 5/2019 | |
| KR | 10-2019-0119671 | A | 10/2019 | |
| KR | 10-2020-0036060 | A | 4/2020 | |
| RU | 2014107668 | | 9/2015 | |
| TW | 201313013 | A | 3/2013 | |
| TW | 201325227 | A | 6/2013 | |
| TW | 201328350 | A | 7/2013 | |
| TW | 201328351 | A | 7/2013 | |
| TW | 201536054 | A | 9/2015 | |
| WO | 2013/035616 | A1 | 3/2013 | |
| WO | 2015/133323 | A1 | 9/2015 | |

OTHER PUBLICATIONS

Extended European Search Report of EP Application No. 19807016.1, dated Jul. 2, 2021, 10 pages.

* cited by examiner

SOLID-STATE IMAGING DEVICE AND ELECTRONIC DEVICE EQUIPPED WITH SOLID-STATE IMAGING DEVICE

CROSS REFERENCE TO RELATED APPLICATIONS

This application is a U.S. National Phase of International Patent Application No. PCT/JP2019/009999 filed on Mar. 12, 2019, which claims priority benefit of Japanese Patent Application No. JP 2018-100799 filed in the Japan Patent Office on May 25, 2018. Each of the above-referenced applications is hereby incorporated herein by reference in its entirety.

TECHNICAL FIELD

The present technology relates to a solid-state imaging device and an electronic device equipped with the solid-state imaging device, and particularly relates to a technology of a solid-state imaging device capable of more easily acquiring data in an imaging region.

BACKGROUND ART

In recent years, solid-state imaging devices (image sensors) that are principal components of digital cameras have been increased in demand. For example, it is considered to read pixel signals configuring image data from pixels at a high speed for each column in a solid-state imaging device having a complementary metal oxide semiconductor (CMOS) image sensor.

At the same time, the image data output from the solid-state imaging device is required to have various output formats due to improvement in information processing technology. Therefore, for example, a technique relating to a solid-state imaging device capable of supporting various output formats has also been studied (see Patent Document 1).

CITATION LIST

Patent Document

Patent Document 1: International Publication No. 2015/133323

SUMMARY OF THE INVENTION

Problems to be Solved by the Invention

By the way, in a pixel array in which a plurality of pixels is two-dimensionally arranged, even if a range to output the pixel signals in a column direction can be set as an imaging region, a range to output the pixel signals in a row direction has been difficult to set.

Therefore, the present technology has been made in view of the foregoing and a principal object of the present technology is to provide a solid-state imaging device enabling output of a pixel signal in a row direction and capable of individually setting an imaging region and an electronic device equipped with the solid-state imaging device.

Solutions to Problems

As a result of earnest research to solve the above-described object, the present inventor has succeeded in setting an imaging region in a pixel array and has reached completion of the present technology.

That is, the present technology first provides a solid-state imaging device including:

a pixel array in which a plurality of pixels is two-dimensionally arrayed in a row direction and a column direction;

a control unit configured to set a range to output pixel signals of the plurality of pixels in the pixel array to each of the row direction and the column direction;

a vertical scanning unit configured to output the pixel signals of the plurality of pixels in the range in the column direction set by the control unit, for each row and in the column direction; and a column A/D converter configured to convert the pixel signals of the plurality of pixels in the range in the row direction set by the control unit from analog signals into digital signals, for each column and in the row direction.

In the solid-state imaging device according to the present technology, at least two or more control signals for outputting the pixel signals of the plurality of pixels may be assigned for each row, and the control unit may set the range in the row direction and the range in the column direction to form a region and may set a plurality of the regions and assigns the control signals to the plurality of respective regions.

In the solid-state imaging device according to the present technology, the control unit may set an accumulation time for accumulation for each of the plurality of regions. In this case, the control unit may set the accumulation times set for the respective regions of the plurality of regions to be different from one another or to be same among the regions.

In the solid-state imaging device according to the present technology, the control unit may control the two or more control signals to simultaneously output the pixel signals of the plurality of pixels corresponding to the two or more control signals in the range in the column direction set by the control unit.

In the solid-state imaging device according to the present technology, the control unit may set the plurality of regions independently of one another.

In the solid-state imaging device according to the present technology, a signal line for transmitting the control signal may be connected to at least a reset transistor, an amplification transistor, and a select transistor.

In the solid-state imaging device according to the present technology, a switch configured to switch, for the each control signal, the pixel signals of the plurality of pixels output from the pixel array, may be further included. Furthermore, in the present technology, a selection unit configured to select a signal line for supplying the pixel signals of the plurality of pixels to the column/AD conversion unit may be further included, and the selection unit may include the switch, and may switch, for the each control signal, the pixel signals of the plurality of pixels output from the pixel array.

In this case, the control unit may switch the switch to cause a first A/D converter to convert the pixel signals of the pixels corresponding to first control for controlling at least some even rows into digital signals and cause a second A/D converter to convert the pixel signals of the pixels corresponding to second control for controlling at least some odd rows into digital signals, and cause the first A/D converter and the second A/D converter to output the pixel signals of the pixels, respectively, and next, cause the second A/D converter to convert the pixel signals of the pixels corresponding to the first control into digital signals and cause the first A/D converter to convert the pixel signals of the pixels corresponding to the second control into digital signals, and cause the first A/D converter and the second A/D converter to output the pixel signals of the pixels, respectively.

Moreover, in the present technology, the control unit may switch the switch to output the pixel signal of the pixel corresponding to the first control by the control signal for performing the first control, or output the pixel signal of the pixel corresponding to the second control by the control signal for performing the second control, from among the pixels corresponding to both control of the first control and the second control.

In the solid-state imaging device according to the present technology, a plurality of the column A/D conversion units may be further included, and the control unit may set a standby mode of not allowing conversion into the digital signal, for at least some of the plurality of column A/D conversion units in association with some of the plurality of regions.

In the solid-state imaging device according to the present technology, the control unit may set, for the each control signal, a gain that amplifies the digital signal converted by the column A/D converter.

Furthermore, the present technology provides an electronic device in which a solid-state imaging device is mounted, the solid-state imaging device including:

a pixel array in which a plurality of pixels is two-dimensionally arrayed in a row direction and a column direction;

a control unit configured to set a range to output pixel signals of the plurality of pixels in the pixel array to each of the row direction and the column direction;

a vertical scanning unit configured to output the pixel signals of the plurality of pixels in the range in the column direction set by the control unit, for each row and in the column direction; and a column A/D converter configured to convert the pixel signals of the plurality of pixels in the range in the row direction set by the control unit from analog signals into digital signals, for each column and in the row direction.

Effects of the Invention

According to the present technology, the image quality of a captured image can be improved by setting an imaging region. Note that effects of the present technology are not limited to the above-described effects, and any of effects described in the present disclosure may be exhibited.

MODE FOR CARRYING OUT THE INVENTION

Figure 1:
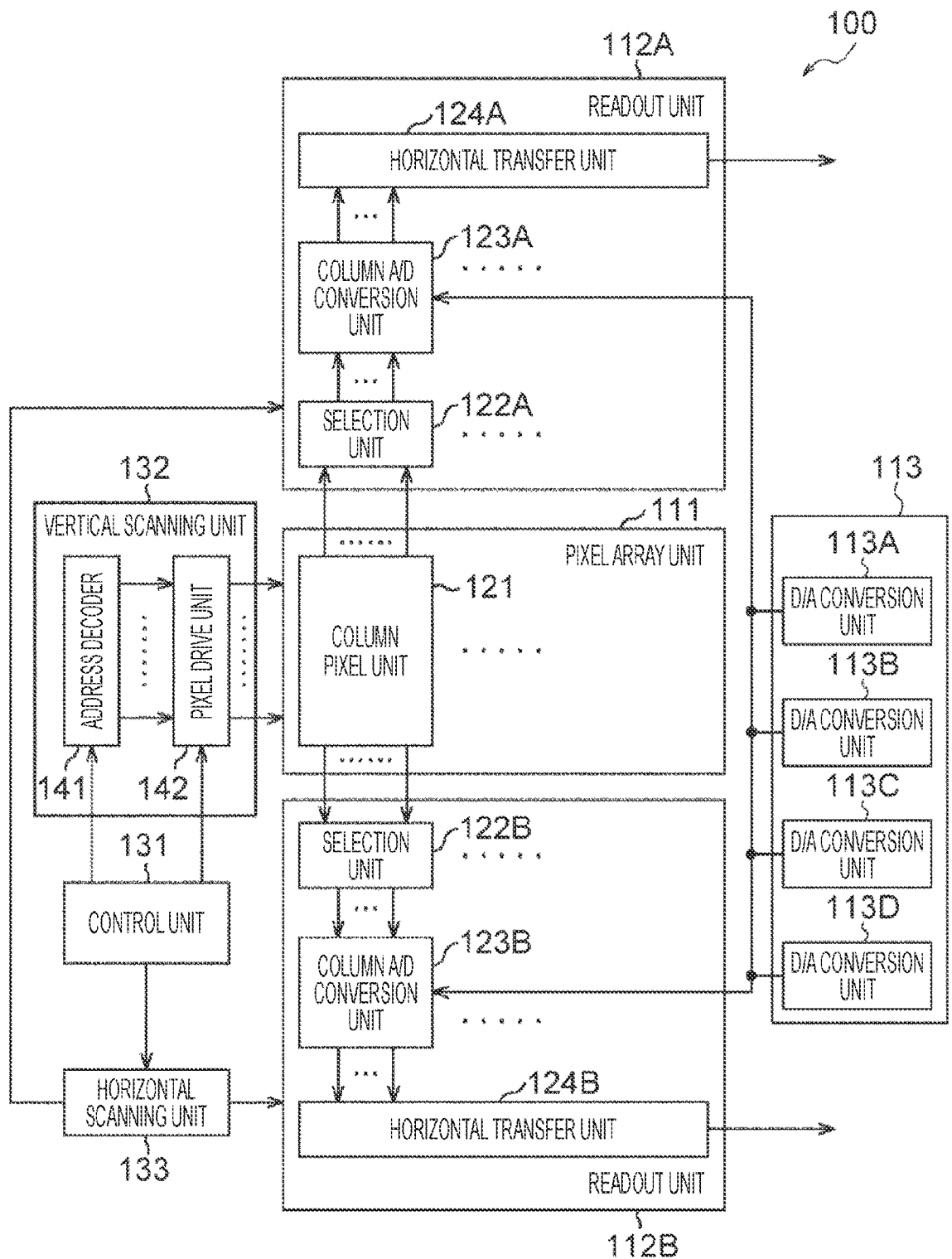
FIG. 1 is a block diagram illustrating a main configuration example of an image sensor to which the present technology is applied.

Hereinafter, favorable embodiments for implementing the present technology will be described with reference to the drawings. Note that the embodiments described below describe examples of a representative embodiment of the present technology, and the scope of the present technology is not construed in a narrow manner by the embodiments.

Note that the description will be given in the following order.

1. Outline of Present Technology
2. First Embodiment (Example 1 of Solid-State Imaging Device)
3. Second Embodiment (Example 2 of Solid-State Imaging Device)
4. Third Embodiment (Example 3 of Solid-State Imaging Device)
5. Fourth Embodiment (Example 4 of Solid-State Imaging Device)
6. Fifth Embodiment (Example 5 of Solid-State Imaging Device)
7. Sixth Embodiment (Example 6 of Solid-State Imaging Device)
8. Seventh Embodiment Regarding Electronic Device
9. Use Example of Solid-State Imaging Device To Which Present Technology is Applied

1. Outline of Present Technology

First, an outline of the present technology will be described. The present technology relates to an electronic device equipped with a solid-state imaging device that sets a range of outputting pixel signals of a plurality of pixels in a pixel array in a row direction and a column direction, and setting an imaging region, and an electronic device equipped with the solid-state imaging device. According to the present technology, the image quality of a captured image can be improved.

A solid-state imaging device has included a vertical scanning unit, and has caused the vertical scanning unit to output a pixel signal of a pixel by controlling an address in the column direction. Meanwhile, in the row direction, the solid-state imaging device has outputted a pixel signal and then an image processing circuit in a subsequent stage and connected to the solid-state imaging device has cut out an image in the row direction.

Here, since the solid-state imaging device has not controlled a range of outputting pixel signals in the row direction, the solid-state imaging device has not been able to freely set the range of outputting pixel signals of pixels in a pixel array.

The present technology has been made in view of the above circumstances and has enabled setting of an imaging region in a pixel array. Thereby, the present technology can improve the image quality of a captured image captured by the solid-state imaging device.

2. First Embodiment (Example 1 of Solid-State Imaging Device)

[Configuration of Solid-State Imaging Device of First Embodiment]

A solid-state imaging device according to a first embodiment of the present technology is a solid-state imaging device including a pixel array in which a plurality of pixels is two-dimensionally arrayed in a row direction and a column direction, a control unit configured to set a range to output pixel signals of the plurality of pixels in the pixel array to each of the row direction and the column direction, a vertical scanning unit configured to output the pixel signals of the plurality of pixels in the range in the column direction set by the control unit, for each row and in the column direction, and a column A/D converter configured to convert the pixel signals of the plurality of pixels in the range in the row direction set by the control unit from analog signals into digital signals, for each column and in the row direction.

The solid-state imaging device according to the first embodiment of the present technology can set the range to output pixel signals in the row direction and the column direction, thereby improving the image quality of a captured image.

FIG. 1 illustrates a solid-state imaging device 100 as an example of the solid-state imaging device according to the first embodiment of the present technology. FIG. 1 is a block diagram illustrating a partial configuration example of a complementary metal oxide semiconductor (CMOS) image sensor as an embodiment of a solid-state imaging device to which the present technology is applied. Note that "upper" means an upper direction in FIG. 1 and "lower" means a lower direction in FIG. 1 unless otherwise specified.

The solid-state imaging device 100 illustrated in FIG. 1 is an imaging device that captures an image of an object and obtains digital data of a captured image. Note that a CMOS image sensor will be described as an example in the present specification. However, the present technology can also be applied to an imaging device other than a CMOS image sensor, such as a charge coupled device (CCD) image sensor.

As illustrated in FIG. 1, the solid-state imaging device 100 includes a pixel array unit 111, a readout unit 112A, a readout unit 112B, a control unit 131, a vertical scanning unit 132, a horizontal scanning unit 133, and a D/A conversion unit 113.

The pixel array unit 111 has a plurality of pixels two-dimensionally arranged in the row direction and the column direction. The pixel array unit 111 is a pixel region in which pixel configurations (unit pixels) each having a photoelectric conversion element such as a photodiode are arranged in a planar manner. Each unit pixel of the pixel array unit 111 receives light from the object, photoelectrically converts incident light, and accumulates a charge. Then, each unit pixel of the pixel array unit 111 outputs the charge as a pixel signal at predetermined timing.

A signal line (vertical signal line) that transfers the pixel signal is assigned to each column of the unit pixels. Furthermore, an operation regarding readout of the pixel signals are controlled for each line (row) of the unit pixels.

The pixel array unit 111 includes a column pixel unit 121 that is a configuration for one column of the unit pixels as many as the number of columns. FIG. 1 illustrates only the configuration for one column, but the pixel array unit 111 has P (P is a natural number) column pixel units 121 in a case where the pixel array unit 111 has P columns of unit pixels, for example. The column pixel unit 121 has a plurality of (for example, N (N is a natural number of 2 or more)) signal lines (vertical signal lines) for transmitting pixel signals output from the unit pixels of the column. That is, the column pixel unit 121 can output a plurality of (for example, N) pixel signals in parallel.

The control unit 131 has a function to set a range to output the pixel signals of a plurality of pixels in the pixel array unit 111 in the row direction and the column direction. Furthermore, the control unit 131 has a function to control an operation of each processing unit of the solid-state imaging device 100. The control unit 131 controls the vertical scanning unit 132 and the horizontal scanning unit 133 to output the pixel signals from the pixel array unit 111.

The vertical scanning unit 132 outputs the pixel signals of a plurality of pixels in the range in the column direction set by the control unit 131, for each row and in the column direction. That is, the vertical scanning unit 132 is controlled by the control unit 131 to drive the unit pixels of each column of the pixel array unit 111 for each line and output the pixel signals. Furthermore, the vertical scanning unit 132 includes an address decoder 141 and a pixel drive unit 142.

The address decoder 141 decodes address specifying information supplied from the control unit 131 and supplies a control signal to the configuration corresponding to the specified address of the pixel drive unit 142.

The pixel drive unit 142 is controlled by the control unit 131 to supply a control signal for driving each unit pixel of the pixel array unit 111. The pixel drive unit 142 has a configuration to supply the control signal for each line of the pixel array unit 111. The pixel drive unit 142 supplies the control signal corresponding to control content specified by the control unit 131 to each unit pixel of the specified line of the pixel array unit 111, using the configuration specified by the address decoder 141. Note that this control signal may also be hereinafter referred to as a pixel control signal.

The readout unit 112A reads the pixel signal from the pixel array unit 111, performs signal processing such as A/D conversion, and outputs the pixel signal. The readout unit 112A includes a selection unit 122A and a column A/D conversion unit 123A for each column (each column pixel unit 121) of the pixel array unit 111. FIG. 1 illustrates only the configuration for one column, but the readout unit 112A includes P (P is a natural number) selection units 122A and P column A/D conversion units 123A in the case where the pixel array unit 111 has P columns of unit pixels, for example.

The selection unit 122A selects a signal line for supplying the pixel signal to the column/AD conversion unit 123A from among a plurality of (for example, N) vertical signal lines of the column pixel unit 121 corresponding to the selection unit 122A. In this case, the selection unit 122A controls connection between the vertical signal line of the column pixel unit 121 (the unit pixels connected to the vertical signal line) and the column A/D conversion unit 123A.

The column A/D conversion unit 123A converts the pixel signals of a plurality of pixels in the range in the row direction set by the control unit 131 from analog signals into digital signals, for each column and in the row direction. In this case, the column A/D conversion unit 123A performs A/D conversion for the pixel signals (analog data) transmitted from the column pixel unit 121 via the selection unit 122A corresponding to the column A/D conversion unit 123A. The column A/D conversion unit 123A includes a plurality (for example, M (M is a natural number of 2 or more, where M N)) A/D conversion units and can perform A/D conversion for a plurality (for example, M) pixel signals transmitted via the selection unit 122A in parallel. Thereby, the selection unit 122A can select, for example, M vertical signal lines from among the N lines and connect the M vertical signal lines to the column A/D conversion unit 123A.

The column A/D conversion unit 123A performs the A/D conversion for the pixel signals using a ramp signal supplied from the D/A conversion unit 113. Details will be described below. Furthermore, the readout unit 112A includes a horizontal transfer unit 124A.

The horizontal transfer unit 124A sequentially outputs the pixel signals (digital data) output from each column A/D conversion unit 123A, that is, the pixel signals of each column of the pixel array unit 111. For example, in a case where the pixel array unit 111 includes P columns of unit pixels and each column A/D conversion unit 123A includes M A/D conversion units, P×M pixel signals are supplied in parallel to the horizontal transfer unit 124A. The horizontal transfer unit 124A sequentially transmits the P×M pixel signals. The pixel signals output from the horizontal transfer unit 124A are supplied to, for example, a processing unit (not illustrated) such as a signal processing unit connected in a subsequent stage. The processing unit in the subsequent stage may be provided inside the solid-state imaging device 100 or may be provided outside the solid-state imaging device 100.

The readout unit 112B is a processing unit that performs similar processing to the readout unit 112A and has a similar configuration to the readout unit 112A. That is, the readout unit 112B includes a selection unit 122B and a column A/D conversion unit 123B for each column of the unit pixels of the pixel array unit 111. The selection unit 122B is a processing unit that performs similar processing to the selection unit 122A and has a similar configuration to the selection unit 122A. The column A/D conversion unit 123B is a processing unit that performs similar processing to the column A/D conversion unit 123A and has a similar configuration to the column A/D conversion unit 123A. The readout unit 112B includes a horizontal transfer unit 124B. The horizontal transfer unit 124B is a processing unit that performs similar processing to the horizontal transfer unit 124A and has similar configuration to the horizontal transfer unit 124A.

Hereinafter, in the case where there is no need to distinguish and describe the readout unit 112A and the readout unit 112B from each other, they are simply referred to as readout unit(s) 112. Similarly, in the case where there is no need to distinguish and describe the selection unit 122A and the selection unit 122B from each other, they are simply referred to as selection unit(s) 122. Similarly, in the case where there is no need to distinguish and describe the column A/D conversion unit 123A and the column A/D conversion unit 123B from each other, they are simply referred to as column A/D conversion unit(s) 123. Similarly, in the case where there is no need to distinguish and describe the horizontal transfer unit 124A and the horizontal transfer unit 124B from each other, they are simply referred to as horizontal transfer unit(s) 124.

The D/A conversion unit 113 supplies a predetermined ramp signal to the column A/D conversion unit 123. The D/A conversion unit 113 includes, as an example, four D/A conversion units, that is, a D/A conversion unit 113A, a D/A conversion unit 113B, a D/A conversion unit 113C, and a D/A conversion unit 113D. Therefore, the D/A conversion unit 113 can supply four ramp signals. Note that the D/A conversion unit 113 is not limited to the four D/A conversion units 113 and can be changed according to the number of ramp signals.

The above-described solid-state imaging device 100 according to the first embodiment illustrated in FIG. 1 includes two systems of paths for outputting the pixel signals from the pixel array unit 111. That is, in the case of FIG. 1, the readout unit 112 includes the readout unit 112A and the readout unit 112B. The number of routes is arbitrary and may be one system or three or more systems. Hereinafter, the case of two systems and the case of four systems will be appropriately described.

Figure 2:
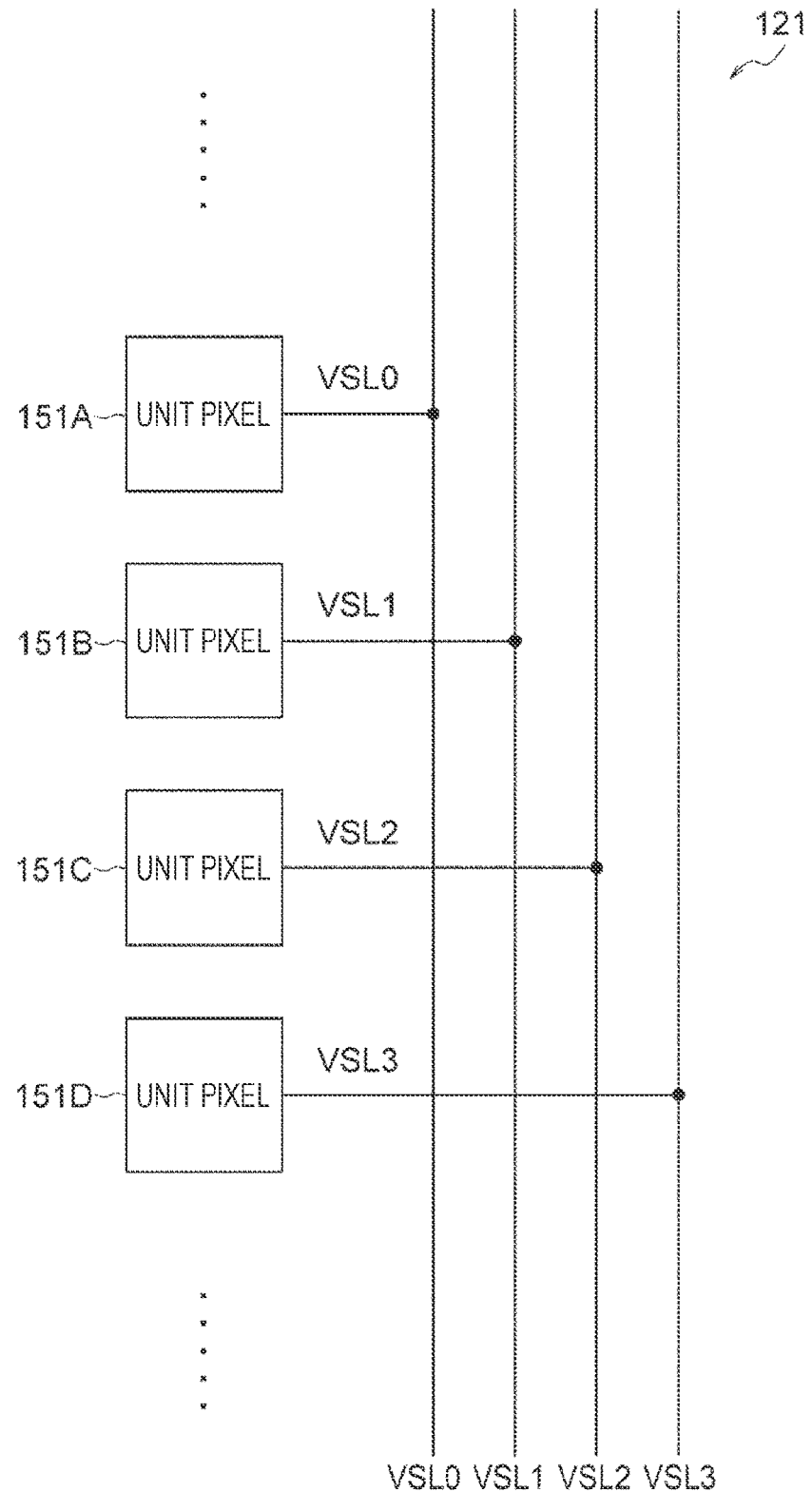
FIG. 2 is a diagram illustrating a main configuration example of a column pixel unit.

FIG. 2 illustrates a main configuration example of the column pixel unit 121. As described above, a plurality of (for example, N (N is a natural number of 2 or more)) vertical signal lines is assigned to the column pixel unit 121. Each unit pixel of the column pixel unit 121 (that is, each unit pixel of the column of the pixel array) is connected to any of the plurality of vertical signal lines. Furthermore, the number of unit pixels included in the column pixel unit 121 is arbitrary.

In the case in FIG. 2, four vertical signal lines (VSL0, VLS1, VSL2, and VSL3) are assigned, and four unit pixels (a unit pixel 151A, a unit pixel 151B, a unit pixel 151C, and a unit pixel 151D) are illustrated. The unit pixel 151A is connected to the vertical signal line VSL0. The unit pixel 151B is connected to the vertical signal line VSL1. The unit pixel 151C is connected to the vertical signal line VSL2. The unit pixel 151D is connected to the vertical signal line VSL3. In a case where the column pixel unit 121 includes five or more unit pixels, the other unit pixels are similarly connected to any of the four vertical signal lines (VSL0, VLS1, VSL2, and VSL3).

Note that, hereinafter, in the case where there is no need to distinguish and describe the unit pixels from one another, they are simply referred to as unit pixel(s) 151. Furthermore, in the case where there is no need to distinguish and describe the vertical signal lines from one another, they are simply referred to as vertical signal line(s) VSL.

Figure 3:
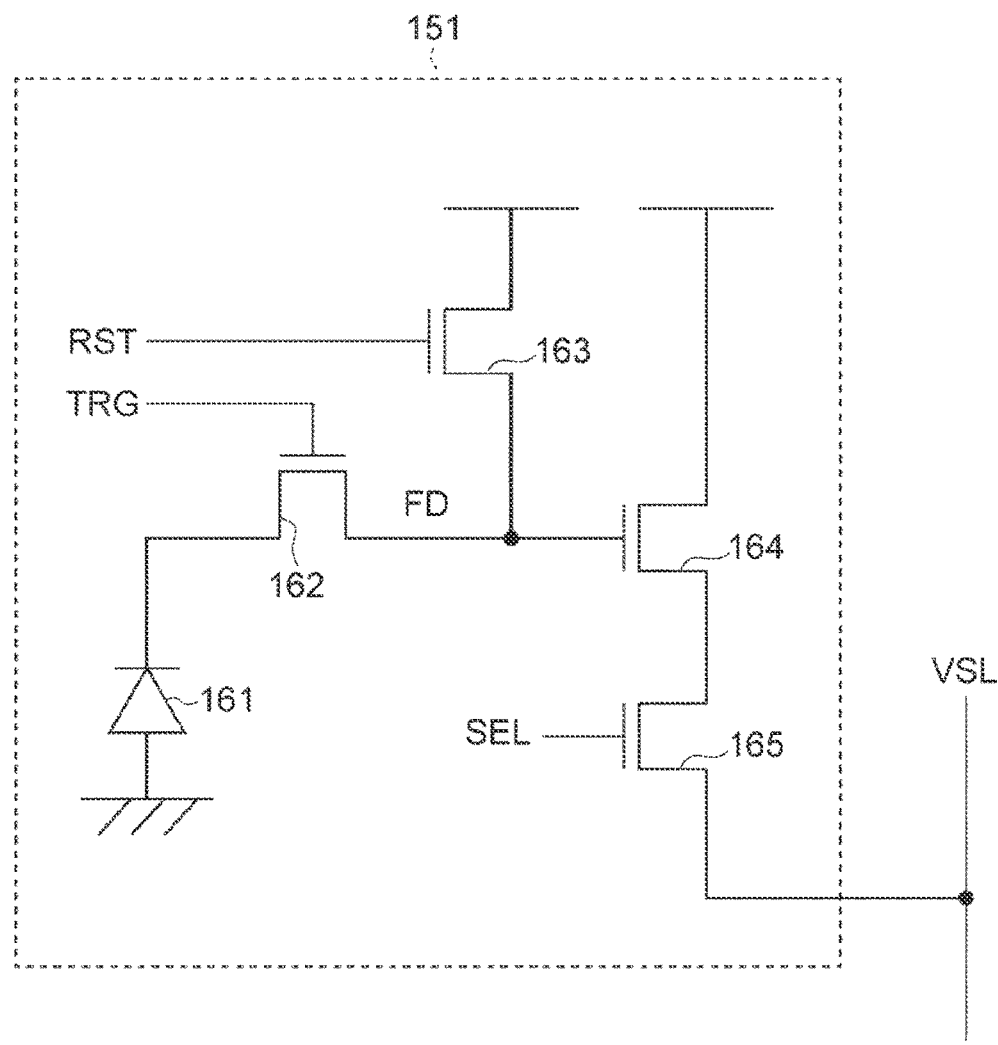
FIG. 3 is a diagram illustrating a main configuration example of a unit pixel.

FIG. 3 illustrates a main configuration example of the unit pixel 151. As illustrated in FIG. 3, the unit pixel 151 includes a photodiode 161, a readout transistor 162, a reset transistor 163, an amplification transistor 164, and a select transistor 165.

The photodiode 161 photoelectrically converts received light into a photocharge having a charge amount corresponding to a light amount of the received light and accumulates the photocharge. An anode electrode of the photodiode 161 is connected to a ground (pixel ground) of the pixel region, and a cathode electrode of the photodiode 161 is connected to a floating diffusion (FD) via the readout transistor 162.

The readout transistor 162 controls readout of the photocharge from the photodiode 161. A drain electrode of the readout transistor 162 is connected to the floating diffusion, and a source electrode of the readout transistor 162 is connected to the cathode electrode of the photodiode 161. Furthermore, a control signal TRG is supplied from the pixel drive unit 142 to a gate electrode of the readout transistor 162. When the control signal TRG (that is, a gate potential of the readout transistor 162) is in an OFF state, the photocharge is not read from the photodiode 161 (the photocharge is accumulated in the photodiode 161). When the control signal TRG (that is, the gate potential of the readout transistor 162) is in an ON state, the photocharge accumulated in the photodiode 161 is read out and supplied to the floating diffusion (FD).

The reset transistor 163 resets a potential of the floating diffusion (FD). A drain electrode of the reset transistor 163 is connected to a power supply potential, and a source electrode of the reset transistor 163 is connected to the floating diffusion (FD). Furthermore, a control signal RST is supplied from the pixel drive unit 142 to a gate electrode of the reset transistor 163. When the control signal RST (that is, a gate potential of the reset transistor 163) is in the OFF state, the floating diffusion (FD) is disconnected from the power supply potential. When the control signal RST (that is, the gate potential of the reset transistor 163) is in the ON state, the charge of the floating diffusion (FD) is discarded to the power supply potential, and the floating diffusion (FD) is reset.

The amplification transistor 164 amplifies a potential change in the floating diffusion (FD) and outputs the amplified potential change as an electrical signal (analog signal). A gate electrode of the amplification transistor 164 is connected to the floating diffusion (FD), a drain electrode of the amplification transistor 164 is connected to the power supply potential, and a source electrode of the amplification transistor 164 is connected to a drain electrode of the select transistor 165. For example, the amplification transistor 164 outputs the potential of the floating diffusion (FD) reset by the reset transistor 163 to the select transistor 165 as a reset signal (reset level). Furthermore, the amplification transistor 164 outputs the potential of the floating diffusion (FD), to which the photocharge has been transferred by the readout transistor 162, to the select transistor 165 as a light accumulation signal (signal level).

The select transistor 165 controls output of the electrical signal supplied from the amplification transistor 164 to the vertical signal line VSL. A drain electrode of the select transistor 165 is connected to the source electrode of the amplification transistor 164 and a source electrode of the select transistor 165 is connected to the vertical signal line VSL. Furthermore, a control signal SEL is supplied from the pixel drive unit 142 to a gate electrode of the select transistor 165. When the control signal SEL (that is, a gate potential of the select transistor 165) is in the OFF state, the amplification transistor 164 and the vertical signal line VSL are electrically disconnected.

Therefore, in the OFF state, the pixel signal is not output from the unit pixel. When the control signal SEL (that is, the gate potential of the select transistor 165) is in the ON state, the unit pixel becomes selected. That is, the amplification transistor 164 and the vertical signal line VSL are electrically connected, and the signal output from the amplification transistor 164 is supplied to the vertical signal line VSL as the pixel signal of the unit pixel. That is, the pixel signal is read from the unit pixel.

Note that the configuration of the unit pixel 151 is arbitrary and is not limited to configuration illustrated in FIG. 3. For example, the readout transistor 162 may be omitted. Furthermore, the number of pixels per unit pixel is arbitrary, and may be one pixel as illustrated in FIG. 3 or may be a plurality of pixels.

Figure 4:
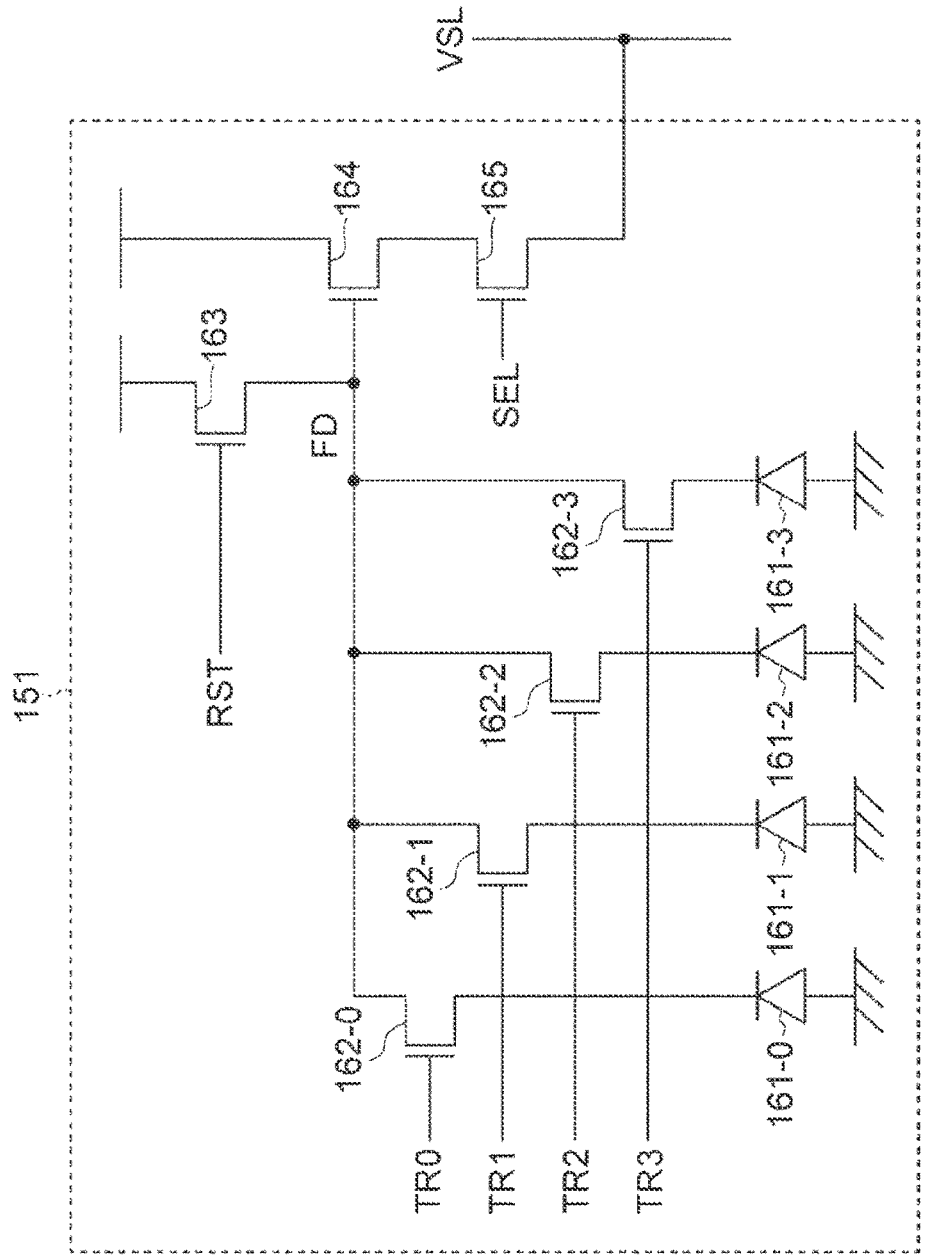
FIG. 4 is a diagram illustrating another configuration example of the unit pixel.

Here, the configuration example of the unit pixel having a plurality of pixels is illustrated in FIG. 4. In the example in FIG. 4, the unit pixel 151 includes four photodiodes 161 (a photodiode 161-0, a photodiode 161-1, a photodiode 161-2, and a photodiode 161-3). In this case, the unit pixel 151 is configured by four pixels. The photodiodes 161 may have the same characteristics as one another but may have the different characteristics from one another. For example, some or all of these photodiodes 161 may photoelectrically convert incident light in a wavelength band different from the others.

For example, the photodiodes 161-0 to 161-3 are arrayed in 2 rows and 2 columns. In this case, the photodiode 161-0 on the upper left in the 2 rows and 2 columns photoelectrically converts a red (R) band. Furthermore, the photodiode 161-1 on the upper right in the 2 rows and 2 columns photoelectrically converts a green (GR) band. Furthermore, the photodiode 161-2 on the lower left in the 2 rows and 2 columns photoelectrically converts a green (GB) band. Furthermore, the photodiode 161-3 on the lower right in the 2 rows and 2 columns photoelectrically converts a blue (B) band. Thereby, the unit pixel 151 can form one unit of a Bayer array.

Note that the first embodiment is not limited to the Bayer array, and the same color may be shared by the floating diffusions (FD).

Furthermore, in the case in FIG. 4, the unit pixel 151 includes four read transistors 162 (a readout transistor 162-0, a readout transistor 162-1, a readout transistor 162-2, and a readout transistor 162-3).

The readout transistor 162-0 controls readout of the photocharge from the photodiode 161-0 on the basis of the control signal TRG (TR0) supplied from the pixel drive unit 142. The readout transistor 162-1 controls readout of the photocharge from the photodiode 161-1 on the basis of the control signal TRG (TR1) supplied from the pixel drive unit 142. The readout transistor 162-2 controls readout of the photocharge from the photodiode 161-2 on the basis of the control signal TRG (TR2) supplied from the pixel drive unit 142. The readout transistor 162-3 controls readout of the photocharge from the photodiode 161-3 on the basis of the control signal TRG (TR3) supplied from the pixel drive unit 142.

In the case in FIG. 4, the configurations of the floating diffusion (FD), the reset transistor 163, the amplification transistor 164, the select transistor 165, and the like are shared in the unit pixel. Then, the pixel signals of the pixels (photodiode 161-0, photodiode 161-1, photodiode 161-2, and photodiode 161-3) are transmitted via the same vertical signal line VSL. In the following description, the configuration of the unit pixel 151 will be described with reference to FIG. 4.

Figure 5:
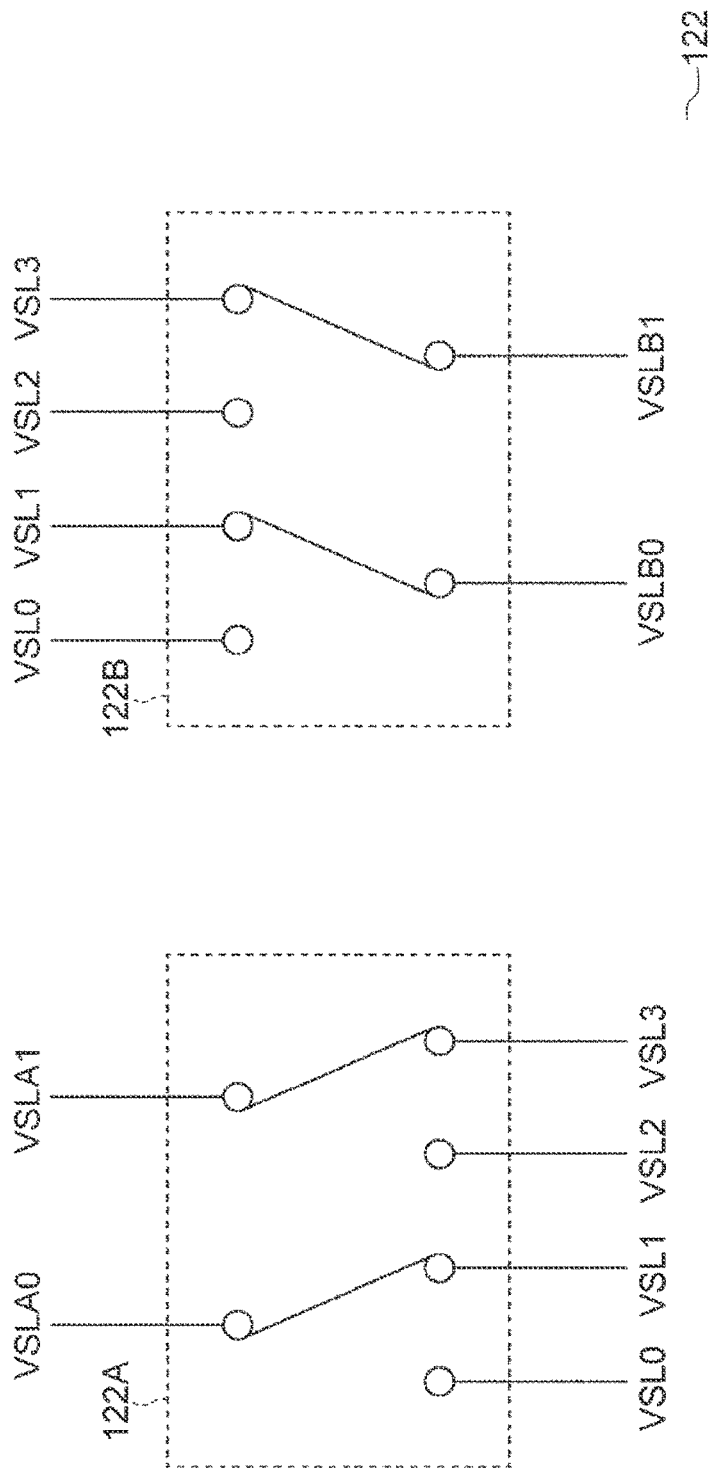
FIGS. 5A and 5B are diagrams illustrating a main configuration example of a selection unit.

FIGS. 5A and 5B are diagrams illustrating a main configuration example of the selection unit 122. FIG. 5A illustrates a configuration example of the selection unit 122A. FIG. 5B illustrates a configuration example of the selection unit 122B. The selection unit 122 is provided for each column pixel unit 121 and controls connection between the N vertical signal lines of the column pixel unit 121 and the M systems of A/D conversion units (M vertical signal lines) of the column A/D conversion unit 123. In the case of the example in FIG. 5A, the selection unit 122A selects any two of the four vertical signal lines (VSL0 to VSL3) of the column pixel unit 121 corresponding to the selection unit 122A and connects the selected two vertical signal lines to the two vertical signal lines (VSLA0 and VSLA1) of the column A/D conversion unit 123A. The selection unit 122 may include a switch that switches the plurality of pixel signals output from the pixel array unit 111 for each control signal.

The selection unit 122B has basically a similar configuration to the selection unit 122A. That is, in the case of the example in FIG. 5B, the selection unit 122B selects any two of the four vertical signal lines (VSL0, VSL1, VSL2, and VSL3) of the column pixel unit 121 corresponding to the selection unit 122B and connects the selected two vertical signal lines to the two vertical signal lines (VSLB0 and VSLB1) of the column A/D conversion unit 123B.

That is, the selection unit 122 can switch the pixel signals of the plurality of pixels output by the pixel array unit 111 for each control signal. In each column, the selection unit 122 selects the vertical signal line VSL corresponding to a mode for outputting the pixel signal from among the plurality of vertical signal lines VSL assigned to the column. At that time, the control unit 131 causes the selection unit 122 to select one of the vertical signal lines VSL for each column. Then, the control unit 131 performs control such that the pixel signal from the pixel connected to the vertical signal line VSL selected by the selection unit 122 is output in that mode, and the output pixel signal is transmitted via the signal line selected by the selection unit 122.

Figure 6:
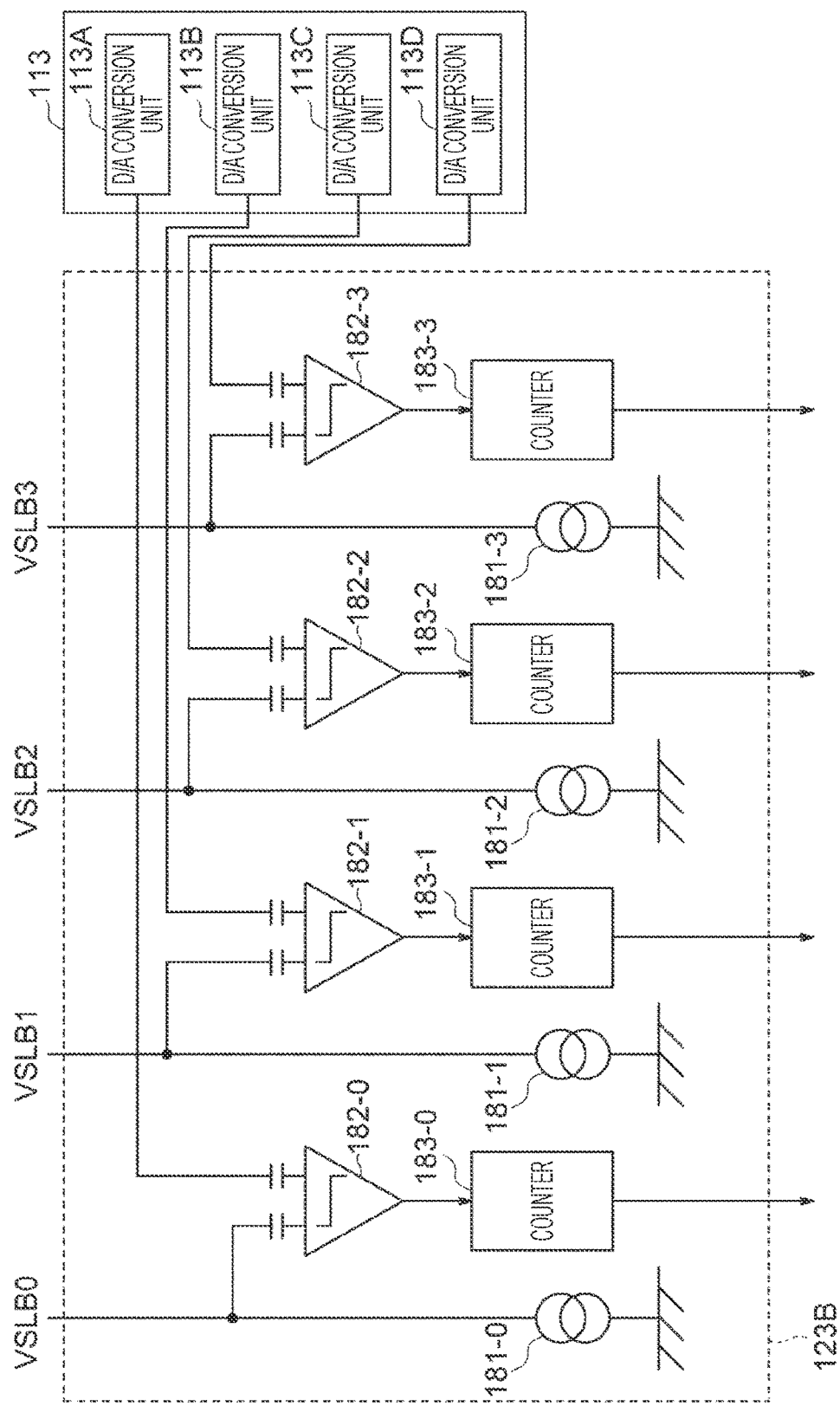
FIG. 6 is a diagram illustrating a main configuration example of a column A/D conversion unit.

FIG. 6 illustrates a main configuration example of the column A/D conversion unit 123B. The column A/D conversion unit 123 includes the M systems of A/D conversion units as described above. In the case in FIG. 6, the column A/D conversion unit 123 includes four systems (VSLB0, VSLB1, VSLB2, and VSLB3) of A/D conversion units. Then, the column A/D conversion unit 123B includes a current source 181-0, a comparator 182-0, and a counter 183-0, as the A/D conversion unit of the vertical signal line VSLB0 system. The current source 181-0 represents a load of a peripheral circuit connected to the vertical signal line VSLB0. The current source 181-0 is connected to the vertical signal line VSLB0 and the ground.

The D/A conversion unit 113 supplies the ramp signal to each system of the column A/D conversion unit 123B. In the case in FIG. 6, the D/A conversion unit 113 includes four D/A conversion units. Specifically, the D/A conversion unit 113 includes the D/A conversion unit 113A that supplies the ramp signal to the A/D conversion unit of the vertical signal line VSLB0 system, the D/A conversion unit 113B that supplies the ramp signal to the A/D conversion unit of the vertical signal line VSLB1 system, the D/A conversion unit 113C that supplies the ramp signal to the A/D conversion unit of the vertical signal line VSLB2 system, and the D/A conversion unit 113D that supplies the ramp signal to the A/D conversion unit of the vertical signal line VSLB3 system.

The comparison unit 182-0 compares the pixel signal transmitted from the unit pixel 151 of the pixel array unit 111 via the vertical signal line VSL, the selection unit 122B, and the vertical signal line VSLB0 with the ramp signal supplied from the D/A conversion unit 113A, and supplies a comparison result (information indicating which of the values is larger) to the counter 183-0.

The counter 183-0 counts a period from the start of counting to a change in a value of the comparison result, and outputs a count value to the horizontal transfer unit 124B as digital data of the pixel signal at the point of time when the value of the comparison result has changed.

The column A/D conversion unit 123B includes a current source 181-1, a comparator 182-1, and a counter 183-1, as the A/D conversion unit of the vertical signal line VSLB1 system. The current source 181-1 has a similar configuration to the current source 181-0. That is, the current source 181-1 represents a load of a peripheral circuit connected to the vertical signal line VSLB1. The current source 181-1 is connected to the vertical signal line VSLB1 and the ground.

The comparison unit 182-1 has a similar configuration to the comparison unit 182-0 and performs similar processing to the comparison unit 182-0. That is, the comparison unit 182-1 compares the pixel signal transmitted from the unit pixel 151 of the pixel array unit 111 via the vertical signal line VSL, the selection unit 122B, and the vertical signal line VSLB1 with the ramp signal supplied from the D/A conversion unit 113B, and supplies a comparison result (information indicating which of the values is larger) to the counter 183-1.

The counter 183-1 has a similar configuration and performs similar processing to the counter 183-0. That is, the counter 183-1 counts a period from the start of counting to a change in a value of the comparison result, and outputs a count value to the horizontal transfer unit 124B as digital data of the pixel signal at the point of time when the value of the comparison result has changed.

The column A/D conversion unit 123B includes a current source 181-2, a comparator 182-2, and a counter 183-2, as the A/D conversion unit of the vertical signal line VSLB1 system. The current source 181-2 has a similar configuration to the current source 181-0. That is, the current source 181-2 represents a load of a peripheral circuit connected to the vertical signal line VSLB1. The current source 181-2 is connected to the vertical signal line VSLB2 and the ground.

The comparison unit 182-2 has a similar configuration to the comparison unit 182-0 and performs similar processing to the comparison unit 182-0. That is, the comparison unit 182-2 compares the pixel signal transmitted from the unit pixel 151 of the pixel array unit 111 via the vertical signal line VSL, the selection unit 122B, and the vertical signal line VSLB2 with the ramp signal supplied from the D/A conversion unit 113C, and supplies a comparison result (information indicating which of the values is larger) to the counter 183-2.

The counter 183-2 has a similar configuration and performs similar processing to the counter 183-0. That is, the counter 183-2 counts a period from the start of counting to a change in a value of the comparison result, and outputs a count value to the horizontal transfer unit 124B as digital data of the pixel signal at the point of time when the value of the comparison result has changed.

The column A/D conversion unit 123B includes a current source 181-3, a comparator 182-3, and a counter 183-3, as an A/D conversion unit of the vertical signal line VSLB3 system. The current source 181-3 has a similar configuration to the current source 181-0. That is, the current source 181-3 represents a load of a peripheral circuit connected to the vertical signal line VSLB3. The current source 181-3 is connected to the vertical signal line VSLB3 and the ground.

The comparison unit 182-3 has a similar configuration to the comparison unit 182-0 and performs similar processing to the comparison unit 182-0. That is, the comparison unit 182-3 compares the pixel signal transmitted from the unit pixel 151 of the pixel array unit 111 via the vertical signal line VSL, the selection unit 122B, and the vertical signal line VSLB3 with the ramp signal supplied from the D/A conversion unit 113D, and supplies a comparison result (information indicating which of the values is larger) to the counter 183-3.

The counter 183-3 has a similar configuration and performs similar processing to the counter 183-0. That is, the counter 183-3 counts a period from the start of counting to a change in a value of the comparison result, and outputs a count value to the horizontal transfer unit 124B as digital data of the pixel signal at the point of time when the value of the comparison result has changed.

The column A/D conversion unit 123A also has a similar configuration and performs similar processing to the column A/D conversion unit 123B. That is, no matter how many configurations the column A/D conversion unit 123 has, each column A/D conversion unit 123 has a similar configuration and performs similar processing to the example in FIG. 6.

Note that the number of systems of the A/D conversion units included in the column A/D conversion unit 123 is arbitrary, and may be one system or three or more systems. Regardless of the number of systems, the D/A conversion unit 113 can supply an independent ramp signal of each system. That is, for example, in the case where the column A/D conversion unit 123 includes M systems of A/D conversion units, independent M D/A conversion units 113 can be provided.

Figure 7:
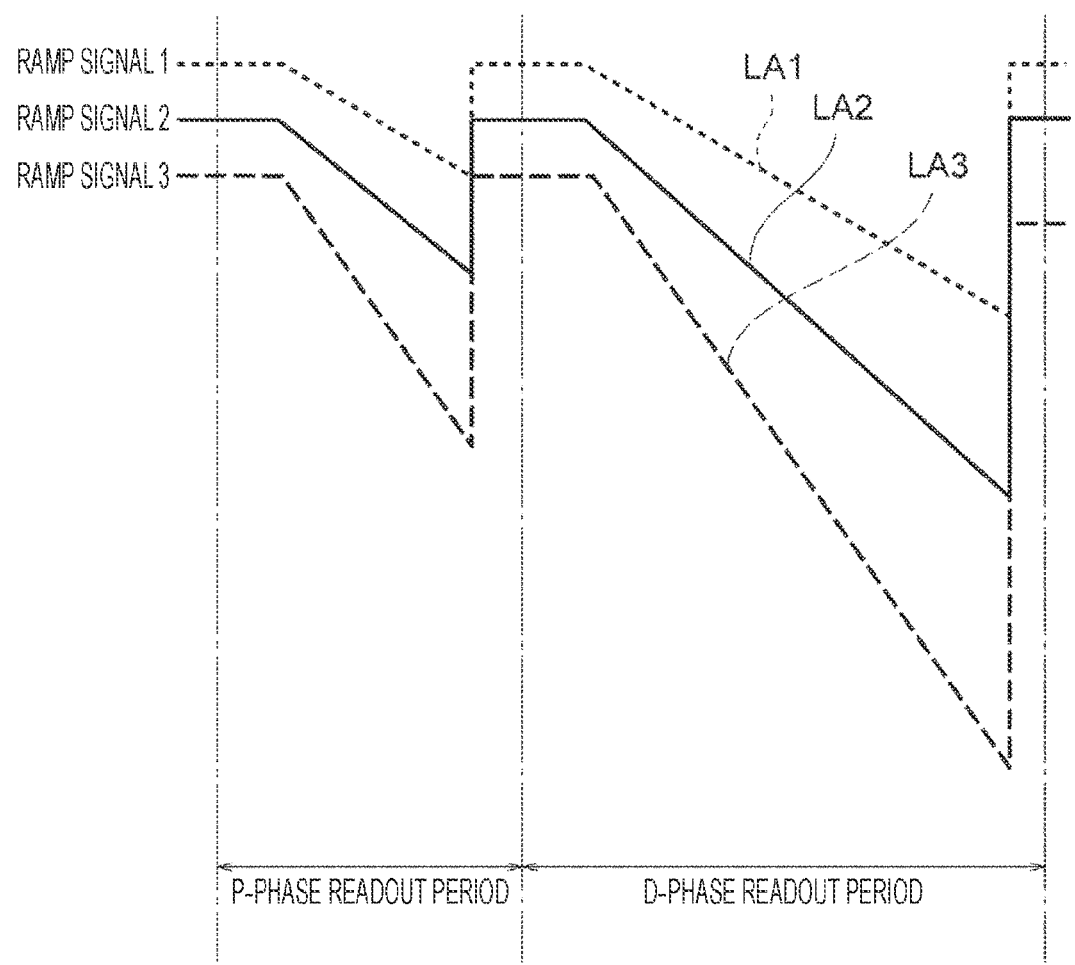
FIG. 7 is a graph illustrating examples of ramp signals output from a D/A conversion unit.

FIG. 7 illustrates examples of the ramp signals output from the D/A conversion unit 113. The D/A conversion unit 113 generates and outputs the ramp signal under the control of the control unit 131. Here, a gain of the ramp signal of the A/D conversion unit of the column A/D conversion unit 123 can be set using the slope of the ramp signal. For example, in a case where the slope of the ramp signal is small, the gain of the A/D conversion unit of the column A/D conversion unit 123 can be set to be large. On the other hand, in a case where the slope of the ramp signal is large, the gain of the A/D conversion unit of the column A/D conversion unit 123 can be set to be small. Furthermore, the D/A conversion unit 113 outputs the ramp signal twice for each readout of the pixel signal. In the first output of the ramp signal, a reset level (P phase) of the unit pixel 151 is read (this period is called P-phase readout period), and the pixel signal of the P-phase unit pixel 151 is A/D converted by the column A/D conversion unit 123. In the second output of the ramp signal, a signal (D phase) photoelectrically converted by the unit pixel 151 is read (this period is called D-phase readout period), and the pixel signal of the D-phase unit pixel 151 is A/D converted by the column A/D conversion unit 123. Furthermore, the slope of the ramp signal in the P-phase readout period and the slope of the ramp signal in the D-phase readout period are the same. Note that "upper" means an upper direction in FIG. 7 and "lower" means a lower direction in FIG. 7 unless otherwise specified.

FIG. 7 illustrates that, for example, a ramp signal 1, a ramp signal 2, and a ramp signal 3 have different slopes from one another. As for the slope of the ramp signal, the D-phase readout period can be shortened by making the slope steep while the D-phase readout period can be made long by making the slope gentle. For example, the column A/D conversion unit 123B includes a comparison unit 182-0 and a counter 183-0 (see FIG. 6). The comparison unit 182-0 compares the magnitude of the pixel signal transmitted via the vertical signal line VSLB0 with the magnitude of the ramp signal supplied from the D/A conversion unit 113A. Then, the comparison unit 182-0 supplies a comparison result to the counter 183-0. The counter 183-0 counts a period from the start of comparison to a change in the comparison result in the comparison unit 182-0, and outputs a count value.

Therefore, for example, since a slope LA1 of the ramp signal 1 is smaller than a slope LA2 of the ramp signal 2 and a slope LA3 of the ramp signal 3, the D-phase readout period becomes longer. Therefore, the gain of the A/D conversion unit of the column A/D conversion unit 123 can be set to be larger using the ramp signal 1 than using the ramp signal 2 and the ramp signal 3. Meanwhile, since the slope LA2 of the ramp signal 2 is larger than the slope LA1 of the ramp signal 1 and is smaller than the slope LA3 of the ramp signal 3, the D-phase readout period becomes a period between the ramp signal 1 and the ramp signal 3. Therefore, the gain of the A/D conversion unit of the column A/D conversion unit 123 can be set to be larger using the ramp signal 2 than using the ramp signal 3 and to be smaller using the ramp signal 2 than using the ramp signal 1. Meanwhile, since the slope LA3 of the ramp signal 3 is larger than the slope LA1 of the ramp signal 1 and the slope LA2 of the ramp signal 2, the D-phase readout period becomes shorter. Therefore, the gain of the A/D conversion unit of the column A/D conversion unit 123 can be set to be smaller using the ramp signal 3 than using the ramp signal 1 and the ramp signal 2.

Note that, in the D/A conversion unit 113, the slopes (slopes LA1, LA2, and LA3) are not limited to the three slopes. The slopes of the predetermined ramp signals can be set for the D/A conversion unit 113A, the D/A conversion unit 113B, the D/A conversion unit 113C, and the D/A conversion unit 113D, respectively. Thereby, the D/A conversion unit 113 can set the gain for each system. Furthermore, the D/A conversion unit 113 can relatively shift offsets of the ramp signals 1, 2, and 3 in an up-down direction under the control of the control unit 131, as illustrated in FIG. 7. The control unit 131 can prevent output data from including noise by relatively shifting the offsets of the ramp signals 1, 2, and 3 in the up-down direction.

Figure 8:
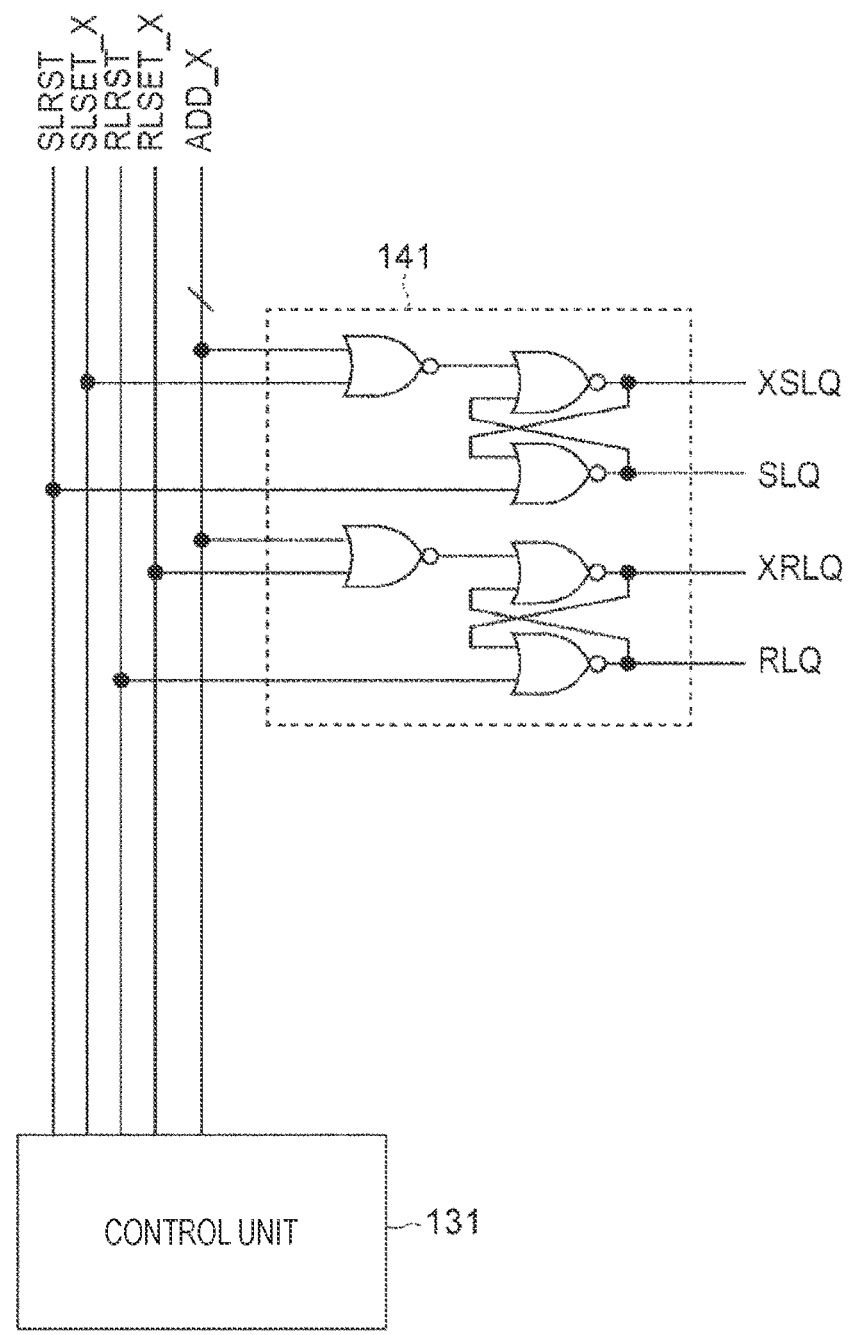
FIG. 8 is a diagram illustrating a main configuration example of an address decoder.

FIG. 8 illustrates a main configuration example of the address decoder 141. The address decoder 141 includes a logic circuit illustrated in FIG. 8 for each line of the pixel array. Then, control signals for specifying addresses such as an address for selecting a pixel (ADD_X), a readout latch reset (RLRST), a readout latch set (RLSET_X), an electronic shutter latch reset (SLRST), and an electronic shutter latch set (SLSET_X) are input from the sensor controller 131 to the address decoder 141. The address decoder 141 sets a value "H (high)" as a readout latch (RLQ) or an electronic shutter latch (SLQ) to the pixel drive unit 142 on the basis of the above input signals in the logic circuit of the line specified by the control unit 131. NOT_readout latch (XRLQ) and NOT_electronic shutter latch (XSLQ) are pulses in which the control signals have a negative logic.

Figure 9:
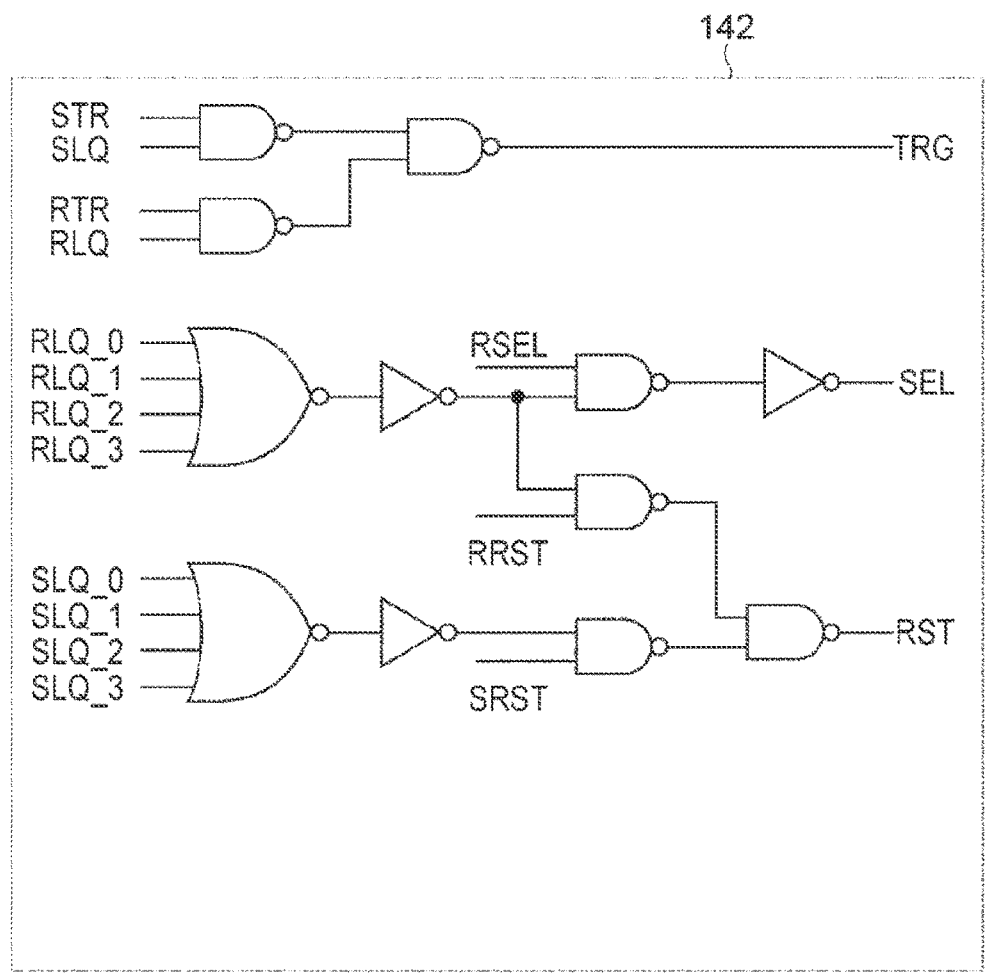
FIG. 9 is a diagram illustrating a main configuration example of a pixel drive unit.

FIG. 9 illustrates a main configuration example of the pixel drive unit 142. The pixel drive unit 142 includes a logic circuit illustrated in FIG. 9 for each line of the pixel array.

The pixel drive unit 142 supplies the control signal TRG, the control signal SEL, and the control signal RST to the transistors of each unit pixel 151 of the appropriate line according to values of various control signals such as a readout latch output pulse RLQ and an electronic shutter latch SLQ supplied from the address decoder 141, and a readout transfer pulse RTR, an electronic shutter transfer pulse STR, an electronic shutter reset pulse SRST, a readout reset pulse RRST, and a readout select pulse RSEL supplied from the sensor controller 131.

[Region Control of Solid-State Imaging Device of First Embodiment]

Next, region control in which the solid-state imaging device 100 according to the first embodiment of the present technology independently controls four systems and generates an image will be described.

In the first embodiment, at least two or more control signals for outputting the pixel signals of a plurality of pixels are assigned to each row. The control unit 131 sets a range in the row direction and a range in the column direction to form a region, sets a plurality of (here, four) regions, and assigns the control signal for each of the four regions. For example, the control unit 131 assigns the A system control signal to the first region, the B system control signal to the second region, the C system control signal to the third region, and the D system control signal to the fourth region.

Figure 10:
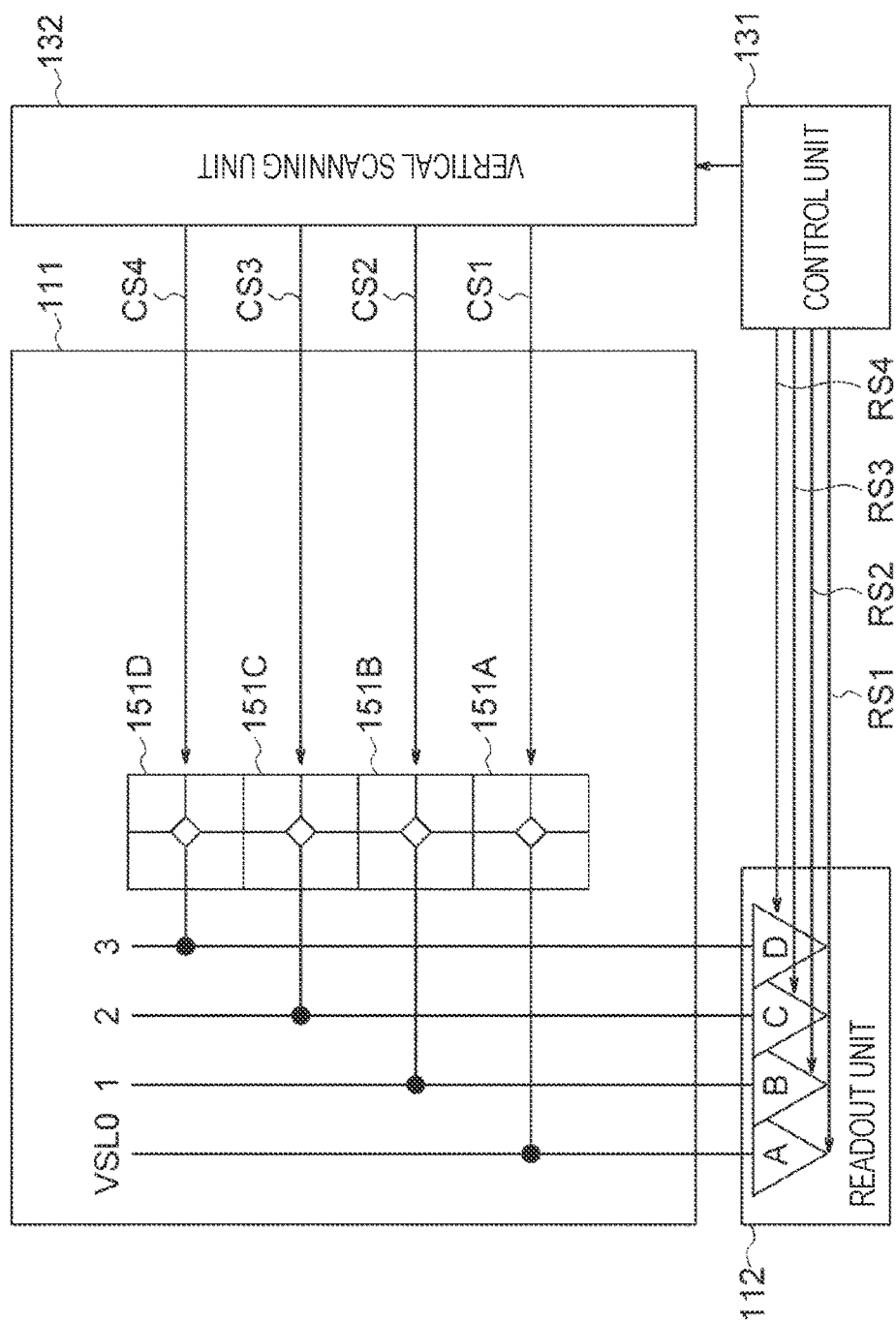
FIG. 10 is an explanatory diagram illustrating a concept of outputting pixel signals of unit pixels of a pixel array unit.

FIG. 10 illustrates a concept of the control unit 131 controlling the unit pixel 151A, the unit pixel 151B, the unit pixel 151C, and the unit pixel 151D of the pixel array unit 111 in the solid-state imaging device 100 of the first embodiment. FIG. 10 is an explanatory diagram illustrating a concept of outputting the pixel signals of the unit pixel 151A, the unit pixel 151B, the unit pixel 151C, and the unit pixel 151D of the pixel array unit 111.

As illustrated in FIG. 10, the vertical scanning unit 132 is controlled by the control unit 131 to drive the unit pixels of each column of the pixel array unit 111 for each line and output the pixel signals. That is, the vertical scanning unit 132 outputs the pixel signals of a plurality of pixels in the range in the column direction set by the control unit 131, for each row and in the column direction. Specifically, a pixel control signal CS1 controls the A system and causes the unit pixel 151A to output the pixel signal. Furthermore, a pixel control signal CS2 controls the B system and causes the unit pixel 151B to output the pixel signal. Furthermore, a pixel control signal CS3 controls the C system and causes the unit pixel 151C to output the pixel signal. Then, a pixel control signal CS4 controls the D system and causes the unit pixel 151D to output the pixel signal.

The readout unit 112 converts the pixel signals of the plurality of pixels in the range in the row direction set by the control unit 131 from analog signals into digital signals, for each column and in the row direction. That is, the readout unit 112 performs signal processing such as A/D conversion of the A system for the pixel signal output from the unit pixel 151A according to a control signal RS1 of the control unit 131, and outputs the signal. The readout unit 112 performs signal processing such as A/D conversion of the B system for the pixel signal output from the unit pixel 151B according to a control signal RS2 of the control unit 131, and outputs the signal. The readout unit 112 performs signal processing such as A/D conversion of the C system for the pixel signal read from the unit pixel 151C according to a control signal RS3 of the control unit 131, and outputs the signal. The readout unit 112 performs signal processing such as A/D conversion of the D system for the pixel signal read from the unit pixel 151D according to a control signal RS4 of the control unit 131, and outputs the signal.

Next, the region control for each region of the A system to the D system will be described. The control unit 131 can independently set a plurality of regions (regions of the A system to the D system).

Figure 11:
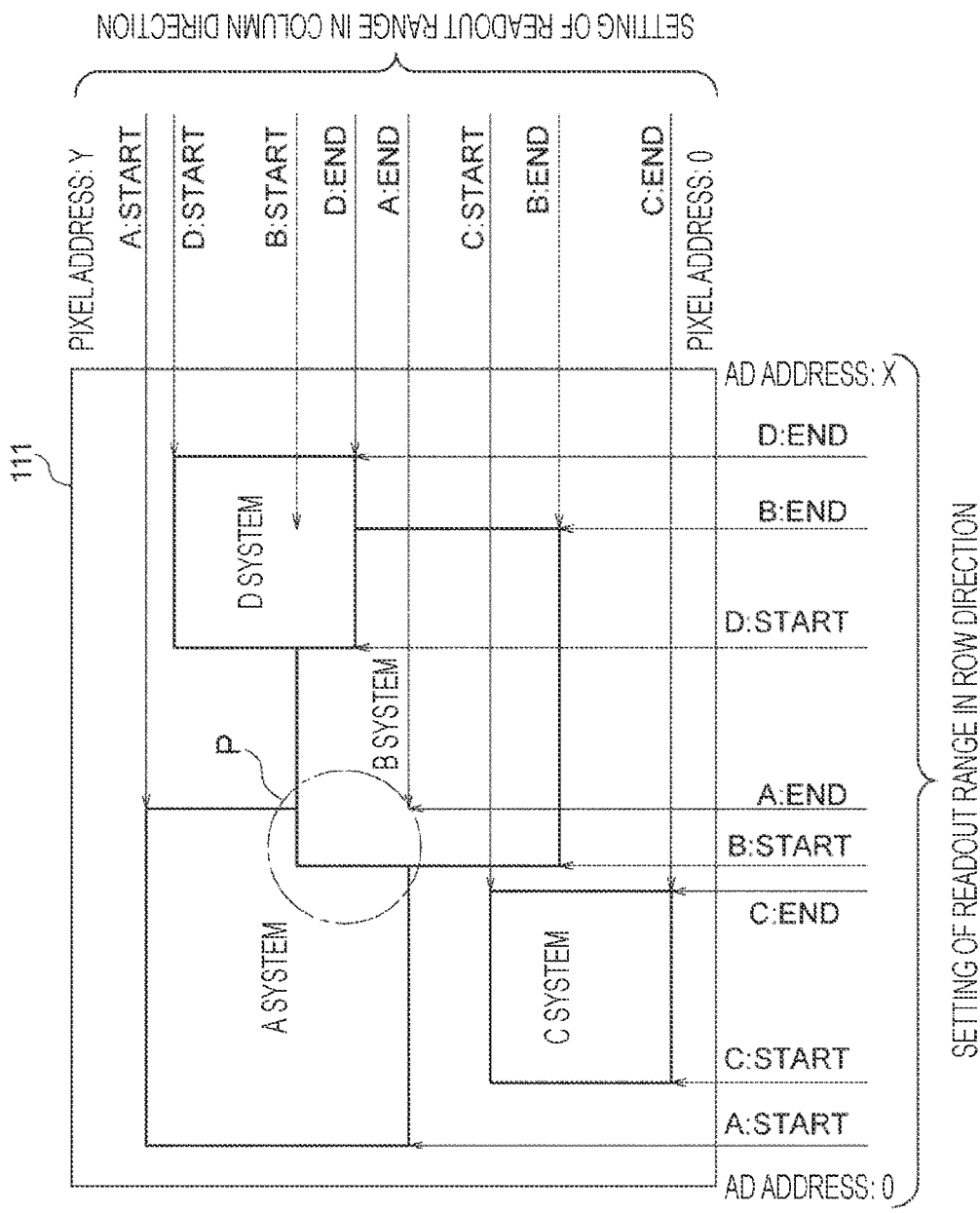
FIG. 11 is an explanatory diagram illustrating a concept of setting four regions of A system to D system in the pixel array unit.

FIG. 11 illustrates a concept in which the control unit 131 sets a region in the pixel array unit 111 for each pixel control signal. FIG. 11 is an explanatory diagram illustrating a concept of setting four regions of the A system to the D system in the pixel array unit 111. Here, in FIG. 11, the direction from AD address 0 to X is the row direction, and the direction from pixel address 0 to Y is the column direction. Note that since the control unit 131 sets the range in the row direction and the column direction, the case where the start point and the end point are set oppositely is also included. In this case, the opposite directions of the row direction and the column direction are also included in the row direction and the column direction.

The control unit 131 sets a range of outputting pixel signals from START of AD address A to END of the AD address A in the row direction, as the region of the A system. Furthermore, the control unit 131 sets a range of outputting the pixel signals from START of pixel address A to END of the pixel address A in the column direction. Thereby, the control unit 131 can set the region of the A system.

Similarly, the control unit 131 sets a range of outputting pixel signals from START of AD address B to END of the AD address B in the row direction. Furthermore, the control unit 131 sets a range of outputting the pixel signals from START of pixel address B to END of the pixel address B in the column direction, as the region of the B system. Thereby, the control unit 131 can set the region of the B system.

The control unit 131 sets a range of outputting pixel signals from START of AD address C to END of the AD address C in the row direction, as the region of the C system. Furthermore, the control unit 131 sets a range of outputting the pixel signals from START of pixel address C to END of the pixel address C in the column direction. Thereby, the control unit 131 can set the region of the C system.

The control unit 131 sets a range of outputting pixel signals from START of AD address D to END of the AD address D in the row direction, as the region of the D system. Furthermore, the control unit 131 sets a range of outputting the pixel signals from START of pixel address D to END of the pixel address D in the column direction. Thereby, the control unit 131 can set the region of the D system.

Next, a region P where the region of the A system and the region of the B system overlap is described with reference to a partially enlarged diagram.

Figure 12:
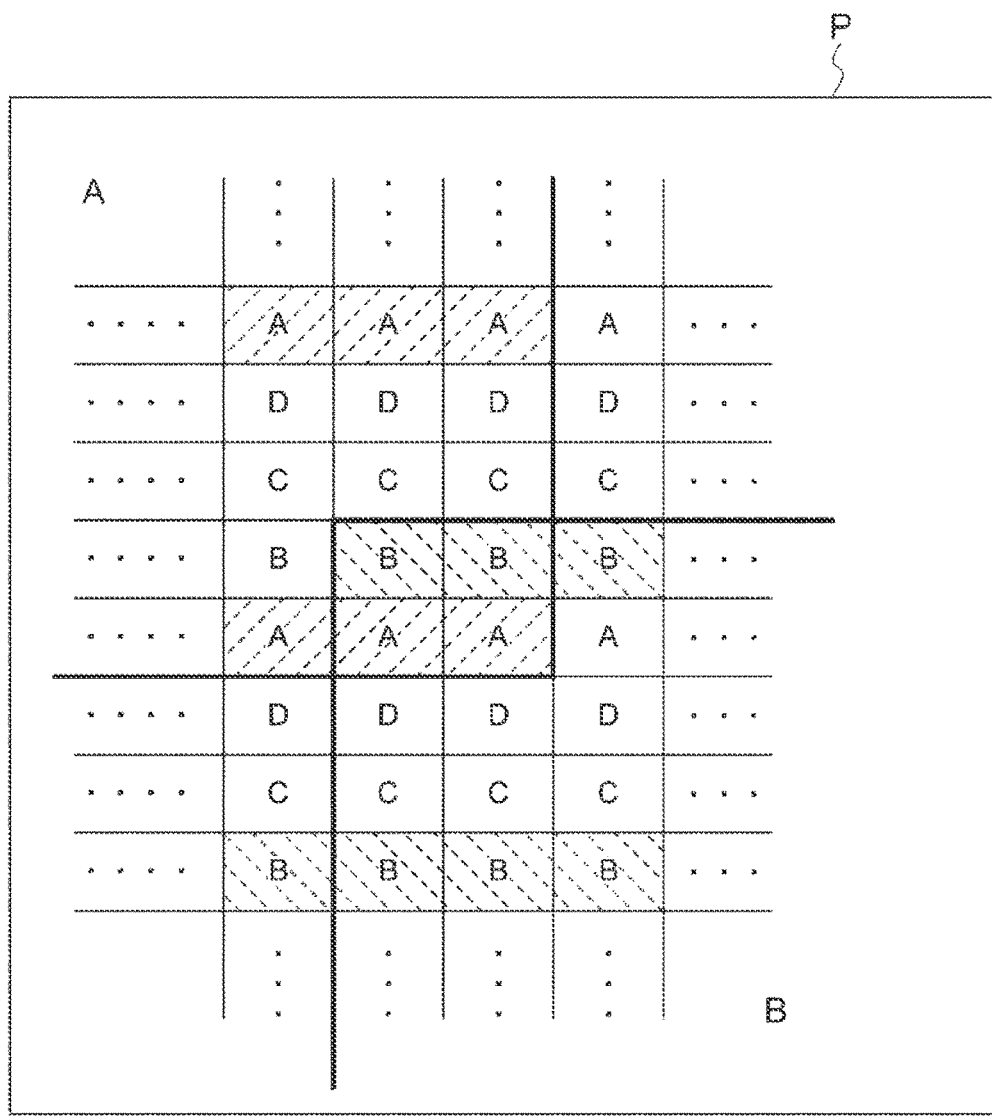
FIG. 12 is a partially enlarged diagram of an overlapping region.

FIG. 12 illustrates a partially enlarged diagram of part of the region P where the region of the A system and the region of the B system overlap. FIG. 12 is a partially enlarged diagram of the overlapping region P.

In the pixel array unit 111, the plurality of unit pixels 151A, the plurality of unit pixels 151B, the plurality of unit pixels 151C, and the plurality of unit pixels 151D are arrayed in each row. In the region of the A system of the pixel array unit 111, a plurality of rows of the A system is controlled by the pixel control signal CS1 from the control unit 131. Furthermore, in the region of the B system of the pixel array unit 111, a plurality of rows of the B system is controlled by the pixel control signal CS2 from the control unit 131.

In this way, the control unit 131 performs control for each row and in the column direction, and the pixel array unit 111 outputs the pixel signals in the ranges in which the region of the A system and the region of the B system are set.

Furthermore, in the solid-state imaging device 100, the control unit 131 can control two or more control signals to simultaneously output the pixel signals of the plurality of pixels corresponding to the two or more control signals in the range in the column direction set by the control unit 131. For example, in rows in which control of the A system and the control of the B system are adjacent to each other in the overlapping region P, two unit pixels 151A and two unit pixels 151B are output.

As a result, the solid-state imaging device 100 according to the first embodiment can improve the resolution of the region P where the region of the A system and the region of the B system overlap.

3. Second Embodiment (Example 2 of Solid-State Imaging Device)

Next, a pixel control signal CS1 of A system and a pixel control signal CS2 of B system will be described. Note that the same configuration as that of the solid-state imaging device 100 in the first embodiment is denoted by the same reference numeral, and redundant description is omitted as appropriate.

Figure 13:
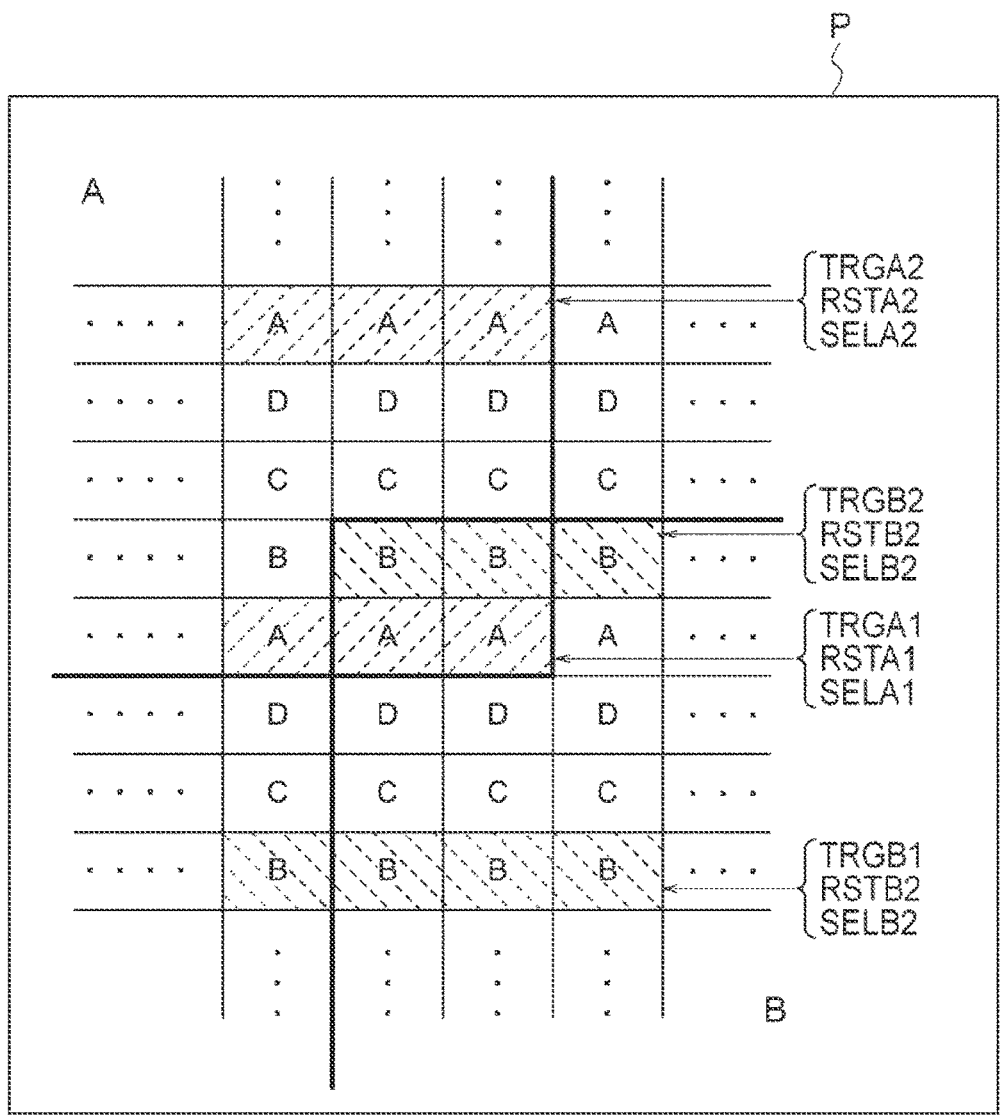
FIG. 13 is an explanatory diagram illustrating a control signal configuring a pixel control signal.

FIG. 13 illustrates a concept of controlling a region of the A system and a region of the B system by the pixel control signal CS1 and the pixel control signal CS2. FIG. 13 is an explanatory diagram illustrating a control signal configuring the pixel control signal CS1 and the pixel control signal CS2.

In a second embodiment of the present technology, a signal line for transmitting the pixel control signal CS1 and the pixel control signal CS2 is connected to at least a reset transistor, an amplification transistor, and a select transistor.

In the second embodiment, the pixel control signal CS1 and the pixel control signal CS2 are connected to a control signal TRG, a control signal SEL, and a control signal RST. That is, in the region of the A system, the pixel control signal CS1 is connected to a control signal TRGA1, a control signal SELA1, and a control signal RSTA1, and causes pixel signals of a plurality of pixels of the A system to be read out. That is, in the region of the B system, the pixel control signal CS2 is connected to a control signal TRGB1, a control signal SELB1, and a control signal RSTB1, and causes pixel signals of a plurality of pixels of the B system to be read out.

Furthermore, a control unit 131 of a solid-state imaging device 100 according to the second embodiment of the present technology can set an accumulation time for each of a plurality of regions. Specifically, the control unit 131 can set the accumulation time for each of the region of the A system, the region of the B system, a region of C system, and a region of D system by pixel control signals (the pixel control signal CS1, the pixel control signal CS2, a pixel control signal CS3, and a pixel control signal CS4).

In this case, the control unit 131 can set the accumulation times set for the plurality of respective regions (the region of the A system, the region of the B system, the region of the C system, and the region of the D system) to be different from one another or to be the same among the regions. For example, the A system and the B system can be set to have long accumulation in which a photoelectric conversion element accumulates charges for a long time, as compared with the C system and the D system.

Furthermore, the control unit 131 can set the plurality of regions independently of one another. Specifically, the control unit 131 can independently set the region of the A system, the region of the B system, the region of the C system, and the region of the D system, and can control the region of the A system, the region of the B system, the region of the C system, and the region of the D system by the pixel control signals (the pixel control signal CS1, the pixel control signal CS2, a pixel control signal CS3, and a pixel control signal CS4), respectively. Thereby, the control unit 131 can individually control the accumulation time for photoelectric conversion for each region of the A system to the D system.

Note that the number of pixel control signals CS1 and the number of pixel control signals CS2 are not limited to one in the A system and the B system. For example, in the control of the A system, two systems of a pixel control signal CS1A1 and a pixel control signal CS1A2 may be provided, and two controls may be provided in the A system. In this case, the pixel control signal CS1A1 and the pixel control signal CS1A2 may have different accumulation times.

Figure 14:
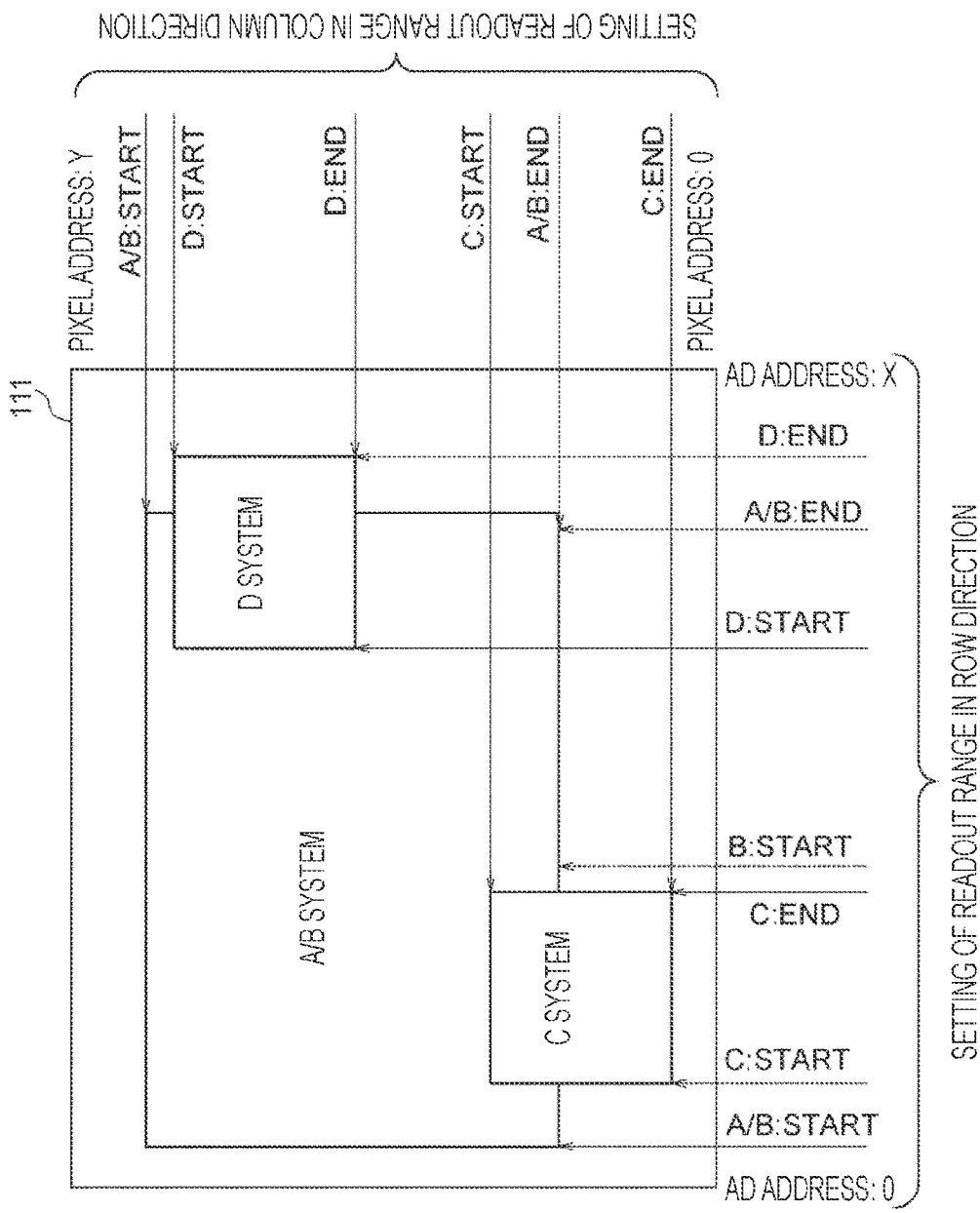
FIG. 14 is an explanatory diagram illustrating a concept of controlling the pixel array unit for each system.

FIG. 14 illustrates a concept of the control unit 131 of the solid-state imaging device 100 according to the second embodiment controlling a pixel array unit 111 independently for each system. FIG. 14 is an explanatory diagram illustrating a concept of controlling the pixel array unit 111 for each system.

The A system and the B system in FIG. 14 have the same pixel address and AD address. Therefore, output pixels in the region of the A system and the region of the B system are doubled, and the resolution becomes high. Furthermore, the control unit 131 can control the pixel control signal CS1 of the A system and the pixel control signal CS2 of the B system to set longer accumulation than the regions of the C system and the D system.

The regions of the C system and the D system have shorter accumulation by the pixel control signal CS3 and the pixel control signal CS4 than the regions of the A system and the B system. However, the embodiment is not limited thereto. The control unit 131 can control the accumulation times of the A system, the B system, the C system, and the D system independently of one another.

Furthermore, in the regions of the C system and the D system, a plurality of unit pixels 151C of the C system and a plurality of unit pixels 151D of the D system can be output, respectively. Therefore, the resolution can be maximized by setting the output regions of the A system to the D system in the entire range.

Figure 15:
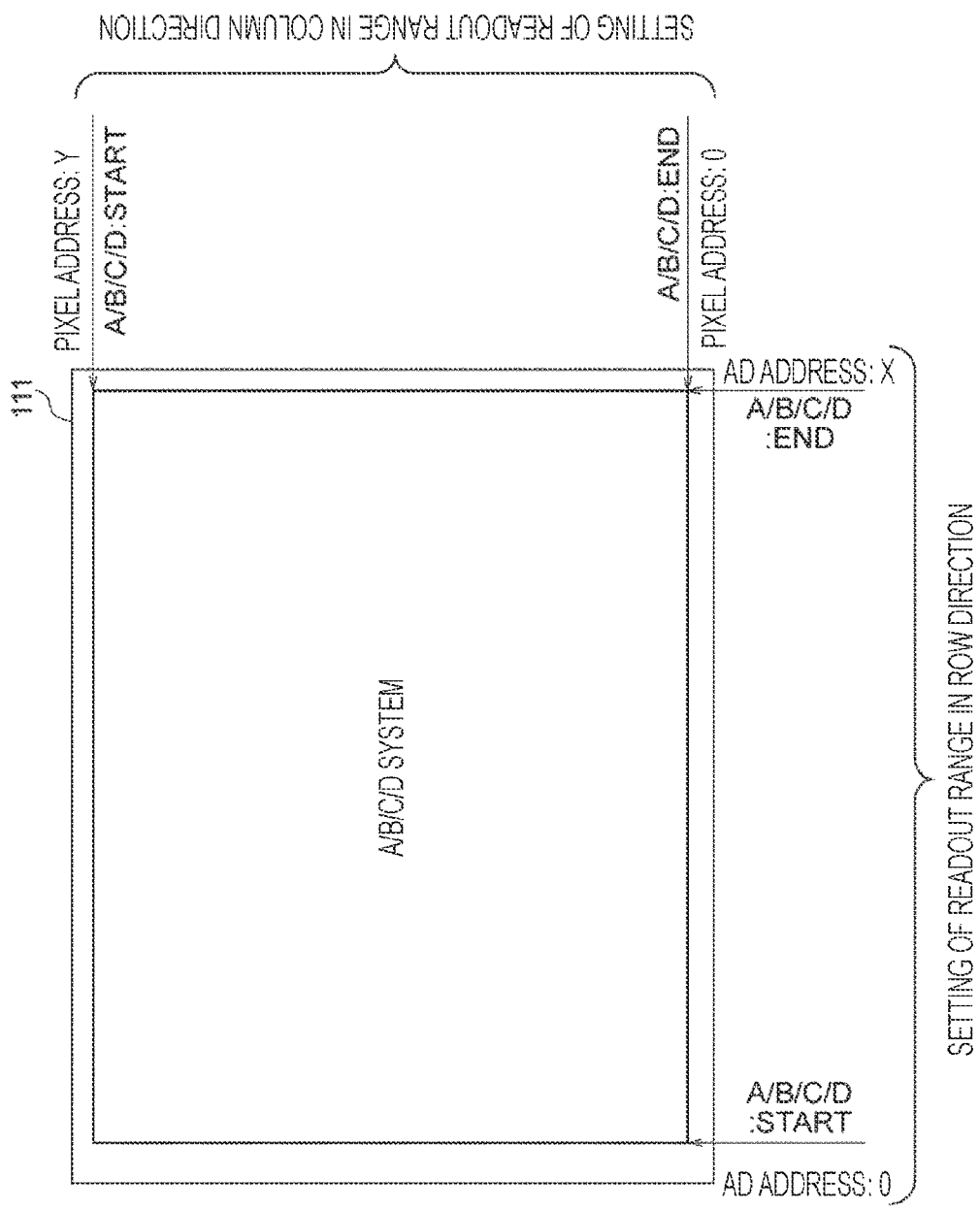
FIG. 15 is an explanatory diagram illustrating a concept in which the four regions of the A system to the D system are set in an overlapping manner in the entire range of the pixel array unit.

FIG. 15 illustrates a control example of setting the regions output in the A system to the D system in the entire range. FIG. 15 is an explanatory diagram illustrating a concept in which the four regions of the A system to the D system are set in an overlapping manner in the entire range of the pixel array unit 111.

The control unit 131 sets a range of outputting pixel signals from START of AD address A to END of the AD address A in the row direction, as the region of the A system. Furthermore, the control unit 131 sets a range of outputting the pixel signals from START of pixel address A to END of the pixel address A in the column direction. Thereby, the control unit 131 can set the region of the A system.

Similarly, the control unit 131 sets a range of outputting pixel signals from START of AD address B to END of the AD address B, which is the same address as the A system, in the row direction. Furthermore, the control unit 131 sets a range of outputting the pixel signals from START of pixel address B to END of the pixel address B, which is the same address as the A system, in the column direction as the region of the B system. Thereby, the control unit 131 can set the region of the B system, which is the same region as the A system.

Similarly, the control unit 131 sets a range of outputting pixel signals from START of AD address C to END of the AD address C, which is the same address as the A system, in the row direction as the region of the C system. Furthermore, the control unit 131 sets a range of outputting the pixel signals from START of pixel address C to END of the pixel address C, which is the same address as the A system, in the column direction. Thereby, the control unit 131 can set the region of the C system, which is the same region as the A system.

Similarly, the control unit 131 sets a range of outputting pixel signals from START of AD address D to END of the AD address D, which is the same address as the A system, in the row direction as the region of the D system. Furthermore, the control unit 131 sets a range of outputting the pixel signals from START of pixel address D to END of the pixel address D, which is the same address as the A system, in the column direction. Thereby, the control unit 131 can set the region of the D system, which is the same region as the A system.

Thereby, the control unit 131 of the solid-state imaging device 100 according to the first embodiment of the present technology can control the output of the pixel signals from the A system to the D system in the pixel array unit 111. In this case, the control unit 131 can output the pixel signals of the plurality of unit pixels (a plurality of unit pixels 151A, a plurality of unit pixels 151B, a plurality of unit pixels C, and a plurality of unit pixels D) of the A system to the D system. Therefore, an image with the maximum resolution can be obtained.

Furthermore, since the A system to the D system are respectively controlled by the pixel control signal CS1, the pixel control signal CS2, the pixel control signal CS3, and the pixel control signal CS4, the control unit 131 can set the accumulation times of the A system to the D system independently of one another.

4. Third Embodiment (Example 3 of Solid-State Imaging Device)

Next, a solid-state imaging device according to a third embodiment of the present technology will be described. A control unit of the solid-state imaging device according to the third embodiment further sets, for each control signal, a gain for amplifying a signal converted by a column A/D converter into a digital signal, in addition to the control unit of the solid-state imaging device according to the first embodiment. Note that the same configuration as that of the solid-state imaging device 100 in the first embodiment is denoted by the same reference numeral, and description is omitted as appropriate.

Figure 16:
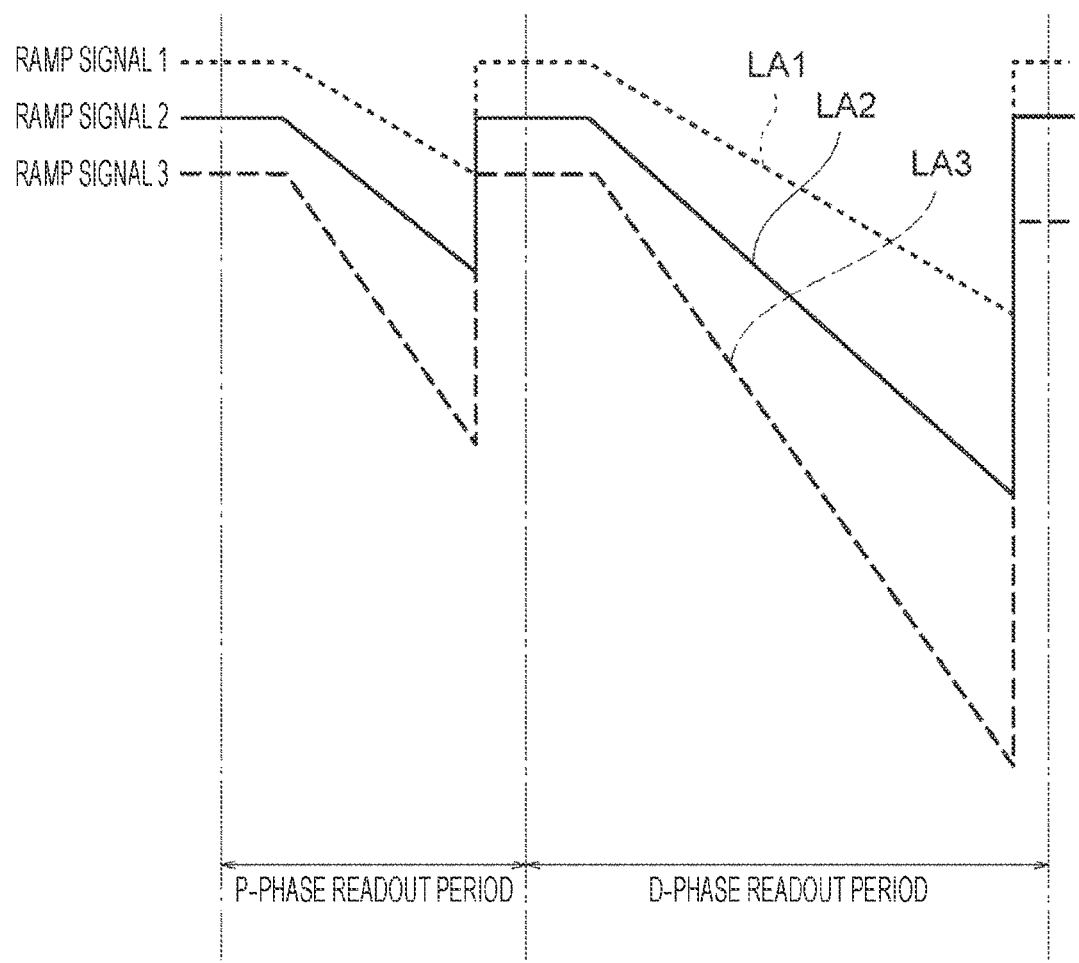
FIG. 16 is a graph illustrating examples of ramp signals output from the D/A conversion unit.

FIG. 16 illustrates examples of ramp signals output from a D/A conversion unit 113. FIG. 16 illustrates that gain of a column A/D conversion unit 123 can be set according to a slope of a ramp signal.

The D/A conversion unit 113 generates and outputs the ramp signal under control of a control unit 131. Here, the gain of the ramp signal of the A/D conversion unit of the column A/D conversion unit 123 can be set using the slope of the ramp signal. For example, in a case where the slope of the ramp signal is small, the gain of the A/D conversion unit of the column A/D conversion unit 123 can be set to be large. On the other hand, in a case where the slope of the ramp signal is large, the gain of the A/D conversion unit of the column A/D conversion unit 123 can be set to be small. Furthermore, the D/A conversion unit 113 outputs the ramp signal twice for each readout of the pixel signal. In the first output of the ramp signal, a reset level (P phase) of a unit pixel 151 is read (this period is called P-phase readout period), and the pixel signal of the P-phase unit pixel 151 is A/D converted by the column A/D conversion unit 123. In the second output of the ramp signal, a signal (D phase) photoelectrically converted by the unit pixel 151 is read (this period is called D-phase readout period), and the pixel signal of the D-phase unit pixel 151 is A/D converted by the column A/D conversion unit 123. Furthermore, the slope of the ramp signal in the P-phase readout period and the slope of the ramp signal in the D-phase readout period are the same. Note that "upper" means an upper direction in FIG. 16 and "lower" means a lower direction in FIG. 16 unless otherwise specified.

FIG. 16 illustrates that, for example, a ramp signal 1, a ramp signal 2, and a ramp signal 3 have different slopes from one another. As for the slope of the ramp signal, the D-phase readout period can be shortened by making the slope steep while the D-phase readout period can be made long by making the slope gentle. For example, a column A/D conversion unit 123B includes a comparison unit 182-0 and a counter 183-0 (see FIG. 6). The comparison unit 182-0 compares the magnitude of the pixel signal transmitted via a vertical signal line VSLB0 with the magnitude of the ramp signal supplied from a D/A conversion unit 113A. Then, the comparison unit 182-0 supplies a comparison result to the counter 183-0. The counter 183-0 counts a period from the start of comparison to a change in the comparison result in the comparison unit 182-0, and outputs a count value.

Therefore, for example, since a slope LA1 of the ramp signal 1 is smaller than a slope LA2 of the ramp signal 2 and a slope LA3 of the ramp signal 3, the D-phase readout period becomes longer. Therefore, the gain of the A/D conversion unit of the column A/D conversion unit 123 can be set to be larger using the ramp signal 1 than using the ramp signal 2 and the ramp signal 3. Meanwhile, since the slope LA2 of the ramp signal 2 is larger than the slope LA1 of the ramp signal 1 and is smaller than the slope LA3 of the ramp signal 3, the D-phase readout period becomes a period between the ramp signal 1 and the ramp signal 3. Therefore, the gain of the A/D conversion unit of the column A/D conversion unit 123 can be set to be larger using the ramp signal 2 than using the ramp signal 3 and to be smaller using the ramp signal 2 than using the ramp signal 1. Meanwhile, since the slope LA3 of the ramp signal 3 is larger than the slope LA1 of the ramp signal 1 and the slope LA2 of the ramp signal 2, the D-phase readout period becomes shorter. Therefore, the gain of the A/D conversion unit of the column A/D conversion unit 123 can be set to be smaller using the ramp signal 3 than using the ramp signal 1 and the ramp signal 2.

Therefore, the D/A conversion unit 113 supplies the ramp signals as illustrated in FIG. 16 to the column A/D conversion unit 123. As a result, the column A/D conversion unit 123 can change the gain according to the slopes (slope LA1, slope LA2, and slope LA3) of the ramp signals from the D/A conversion unit 113. Furthermore, since the D/A conversion unit 113 includes the D/A conversion unit 113A, a D/A conversion unit 113B, a D/A conversion unit 113C, and a D/A conversion unit 113D for respective systems from A system to D system, the gains can be respectively set for the A system to the D system.

For example, in the D/A conversion unit 113A the control unit 131 can set a first predetermined gain in the A system. Furthermore, in the D/A conversion unit 113B the control unit 131 can set a second predetermined gain in the B system. Furthermore, in the D/A conversion unit 113C the control unit 131 can set a third predetermined gain in the C system. Furthermore, in the D/A conversion unit 113D the control unit 131 can set a fourth predetermined gain in the D system. Note that the number of D/A conversion units 113 is not limited to four and the number of D/A conversion units 113 may be reduced by sharing them. Furthermore, the method of changing the gain is not limited thereto, and various methods can be applied.

Furthermore, the D/A conversion unit 113 can relatively shift offsets of the ramp signals 1, 2, and 3 in an up-down direction under the control of the control unit 131, as illustrated in FIG. 16. The control unit 131 can prevent output data from including noise by relatively shifting the offsets of the ramp signals 1, 2, and 3 in the up-down direction.

5. Fourth Embodiment (Example 4 of Solid-State Imaging Device)

In a solid-state imaging device according to a fourth embodiment of the present technology, a switch configured to switch, for each control signal, pixel signals of a plurality of pixels output from a pixel array unit 111, is further included in the solid-state imaging device according to the first embodiment. As an example, a case in which a selection unit 122 includes a switch will be described. Note that the same configuration as that of the solid-state imaging device 100 in the first embodiment is denoted by the same reference numeral, and description is omitted as appropriate.

Figure 17:
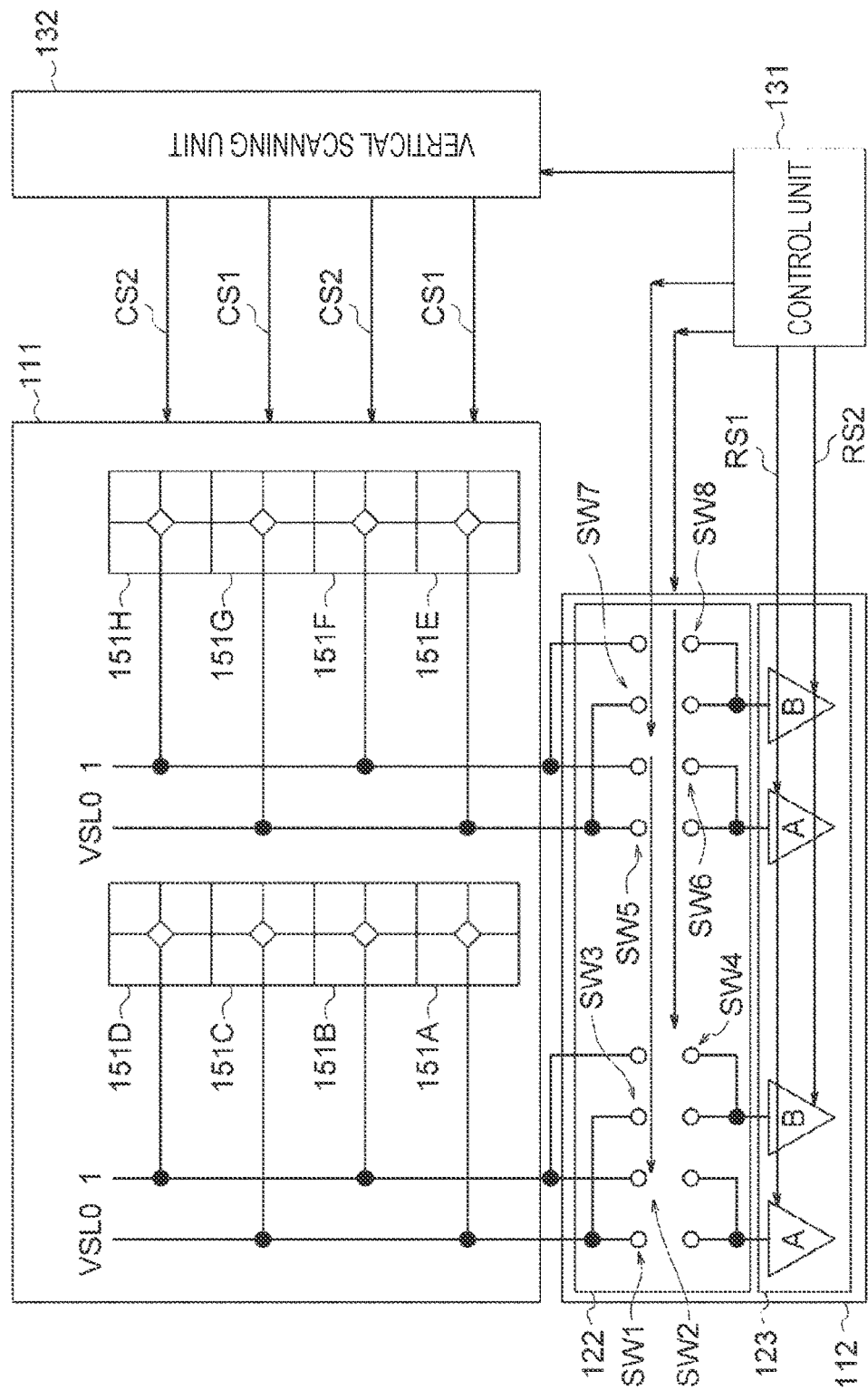
FIG. 17 is an explanatory diagram illustrating a solid-state imaging device including VSL switches.

FIG. 17 illustrates a configuration of the solid-state imaging device according to the fourth embodiment, which further includes VSL switches SW (VSL switch SW1, VSL switch SW2, VSL switch SW3, VSL switch SW4, VSL switch SW5, VSL switch SW6, VSL switch SW7, and VSL switch SW8). FIG. 17 is an explanatory diagram illustrating the solid-state imaging device including the VSL switches SW1 to SW8.

FIG. 17 illustrates a configuration of the solid-state imaging device including two systems of A system and B system. As illustrated in FIG. 17, a vertical scanning unit 132 is controlled by a control unit 131 to drive unit pixels of each column of a pixel array unit 111 for each line and output the pixel signals. Specifically, a pixel control signal CS1 controls the A system and causes a unit pixel 151A to output the pixel signal. Furthermore, a pixel control signal CS2 controls the B system and causes a unit pixel 151B to output the pixel signal. Unit pixels 151C to 151H are assumed to output pixel signals according to the pixel control signal CS1 or the pixel control signal CS2.

Furthermore, the VSL switches SW1 to SW8 are provided in the selection unit 122. The VSL switches SW1 to SW8 are controlled on the basis of control signals for controlling the VSL switches SW1 to SW8. Furthermore, a column A/D conversion unit 123 is controlled on the basis of a control signal RS1 corresponding to the pixel control signal CS1 and a control signal RS2 corresponding to the pixel control signal CS2.

Figure 18:
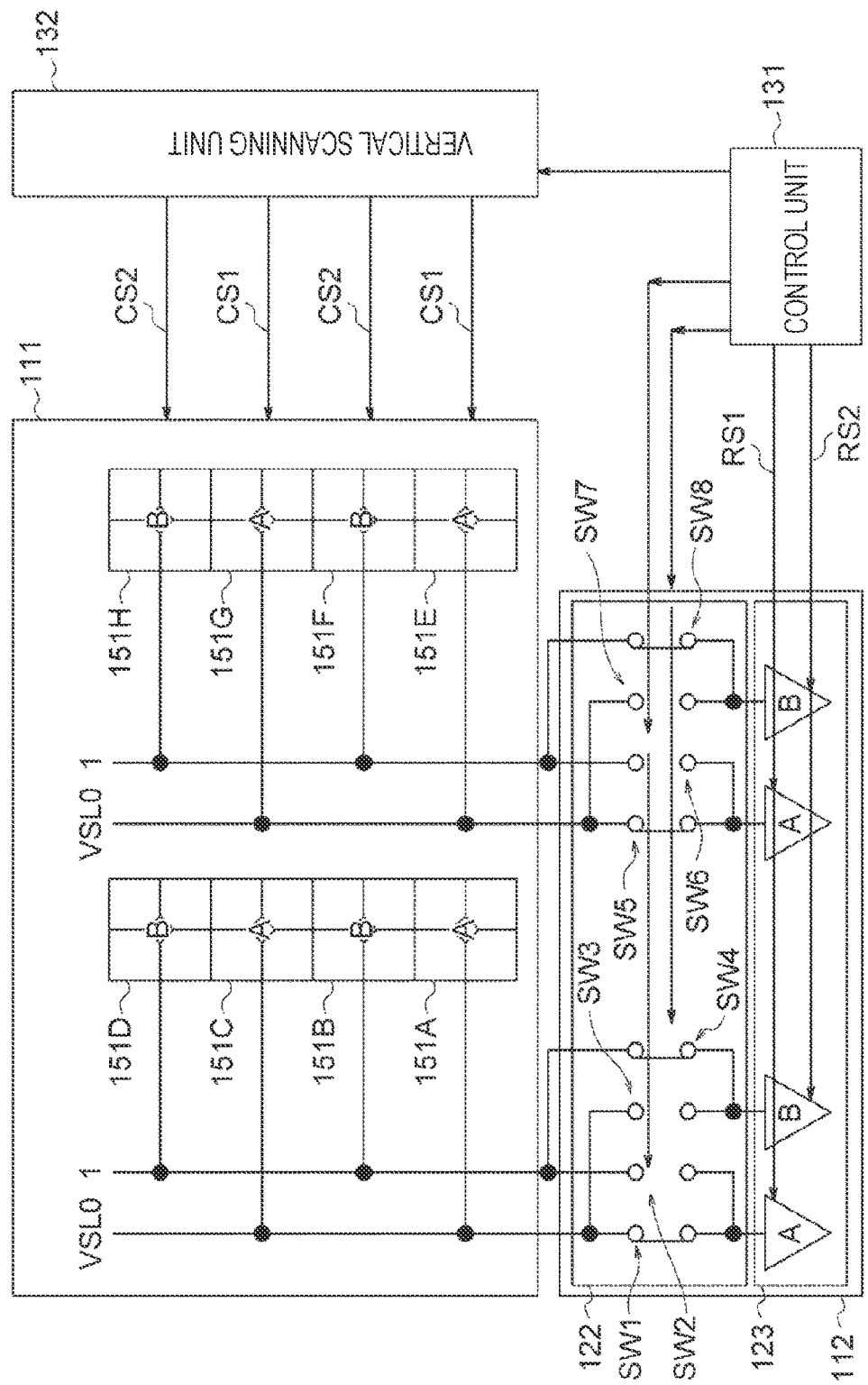
FIG. 18 is an explanatory diagram illustrating a state in which no switching operations of the VSL switches are performed.

FIG. 18 illustrates a conceptual diagram in a case where there is no switching operation of the VSL switches SW1 to SW8. FIG. 18 is an explanatory diagram illustrating a state in which switching of the VSL switches SW1 to SW8 is fixed and the switching operation of the VSL switches SW1 to SW8 is not performed.

In the case where there is no switching operation of the VSL switches SW1 to SW8, for example, a column A/D conversion unit 123A and a column A/D conversion unit 123B output the pixel signals of pixels in each row of the A system or the B system.

In the solid-state imaging device according to the fourth embodiment of the present technology, the control unit causes a first A/D converter to convert pixel signals of pixels corresponding to first control for controlling at least some even rows into digital signals and causes a second A/D converter to convert pixel signals of pixels corresponding to second control for controlling at least some odd rows into digital signals, and causes the first A/D converter and the second A/D converter to output the pixel signals of the pixels, respectively. Next, the control unit switches the switch to cause the second A/D converter to convert the pixel signals of the pixels corresponding to the first control for controlling even rows into digital signals and cause the first A/D converter to convert the pixel signals of the pixels corresponding to the second control for controlling odd rows into digital signals, and cause the first A/D converter and the second A/D converter to output the pixel signals of the pixels, respectively.

According to the solid-state imaging device of the fourth embodiment of the present technology, the pixel signals of the pixels corresponding to the first control and the pixel signals of the pixels corresponding to the second control can be alternately output in units of rows, whereby the resolution can be improved.

Figure 19:
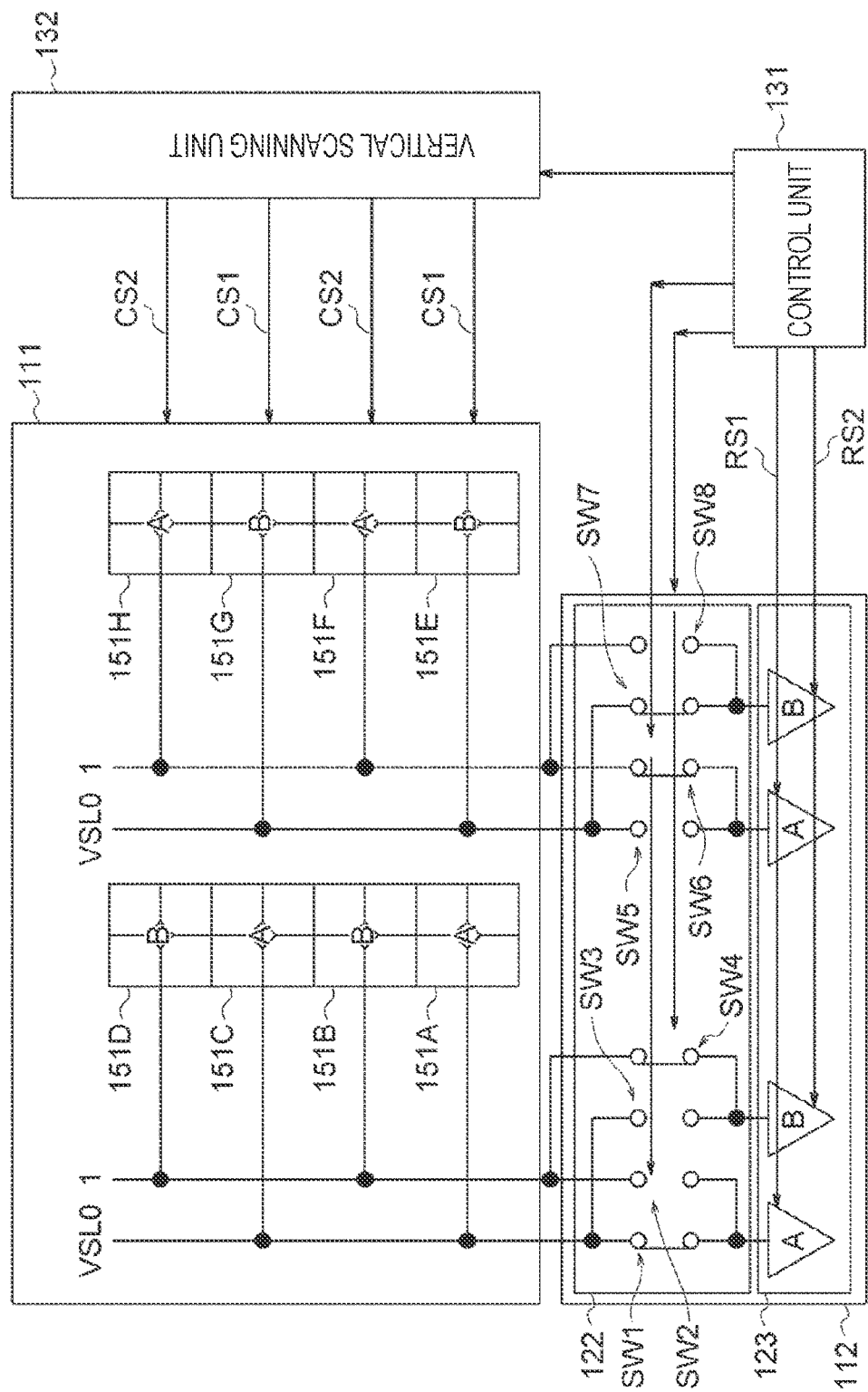
FIG. 19 is an explanatory diagram illustrating switching operations of the VSL switches.

FIG. 19 illustrates switching of the VSL switches SW1 to SW8 for alternately outputting the pixel signals of the pixels corresponding to the first control and the pixel signals of the pixels corresponding to the second control in units of rows. FIG. 19 is an explanatory diagram illustrating switching of the VSL switches SW1 to SW8 of the solid-state imaging device according to the fourth embodiment.

As illustrated in FIG. 19, the control unit 131 switches the VSL switches SW1 to SW8, so that a readout unit 112 can switch the column A/D conversion unit 123A and the column A/D conversion unit 123B to alternately output the pixels signals in units of rows. For example, the column A/D conversion unit 123A outputs a unit pixel 151A, a unit pixel 151C, a unit pixel 151F, and a unit pixel 151H. The column A/D conversion unit 123B outputs a unit pixel 151B, a unit pixel 151D, a unit pixel 151E, and a unit pixel 151D.

Next, the control unit 131 switches the VSL switches SW1 to SW8, so that the column A/D conversion unit 123A outputs the unit pixel 151B, the unit pixel 151D, the unit pixel 151E, and the unit pixel 151G. The column A/D conversion unit 123B outputs the unit pixel 151A, the unit pixel 151C, the unit pixel 151F, and the unit pixel 151H.

As described above, according to the solid-state imaging device of the fourth embodiment of the present technology, the pixel signals of the pixels corresponding to the first control and the pixel signals of the pixels corresponding to the second control can be alternately output from the pixel array unit 111 in units of rows. Thereby, the solid-state imaging device according to the fourth embodiment of the present technology can improve the resolution of an image in a set region.

Figure 20:
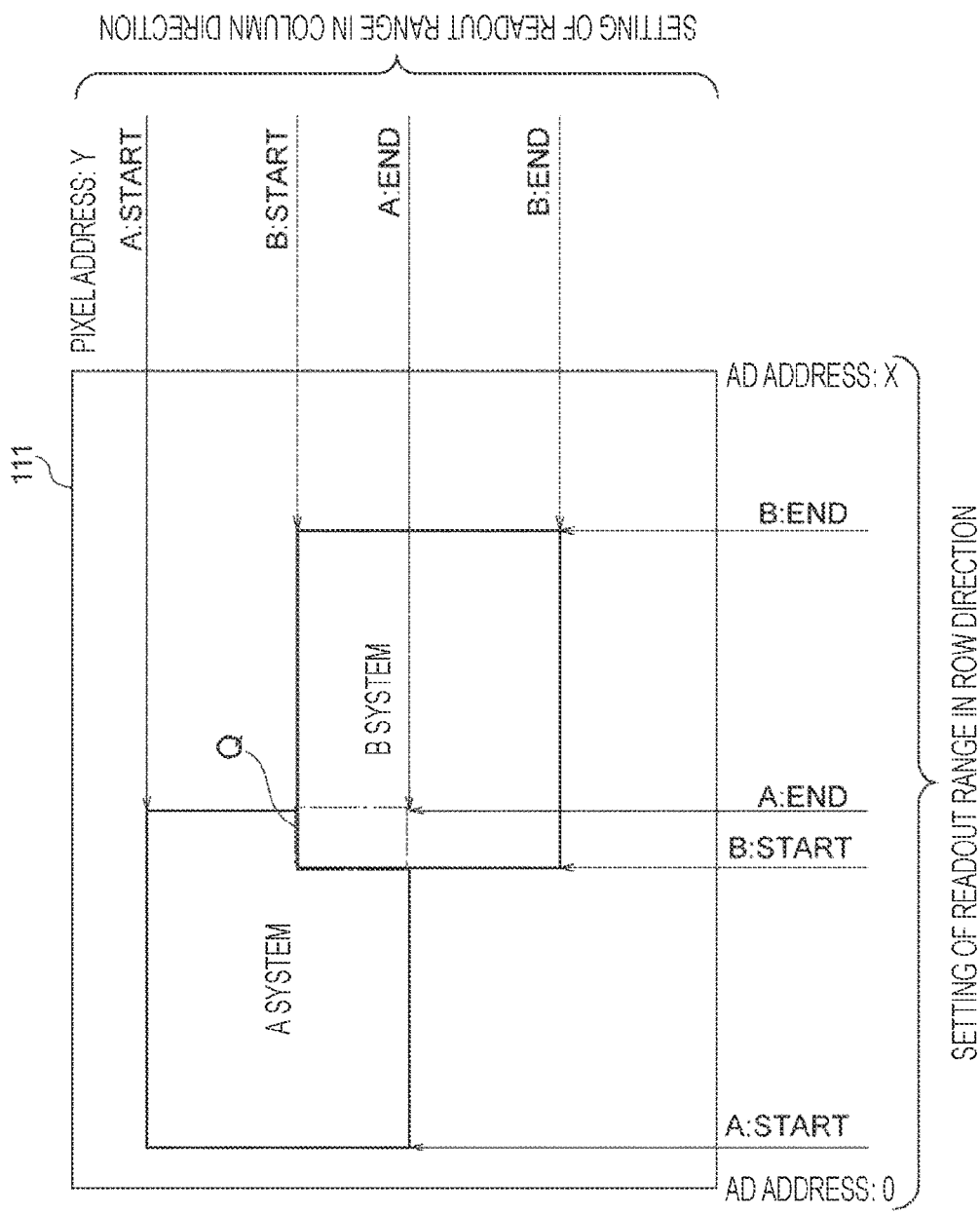
FIG. 20 is an explanatory diagram illustrating a concept of alternately outputting even rows and odd rows in the A system and the B system of the pixel array unit.

FIG. 20 illustrates a state in which the pixel array unit 111 outputs pixel signals of pixels of the A system and the B system. FIG. 20 is an explanatory diagram illustrating a concept of alternately outputting even rows and odd rows in the A system and the B system of the pixel array unit 111.

As illustrated in FIG. 20, the pixel signals of the pixels of the A system and the B system can be alternately output for each row, whereby the resolution can be improved in the pixel array unit 111. Note that a region Q where the region of the A system and the region of the B system overlap has the same resolution as the non-overlapping region.

As described above, in the fourth embodiment, since the VSL switches SW1 to SW8 are provided, the pixel signals of the pixels of one system are output when the other system of the two systems is being output. The pixel signals can be alternately output for each row.

Figure 21A:
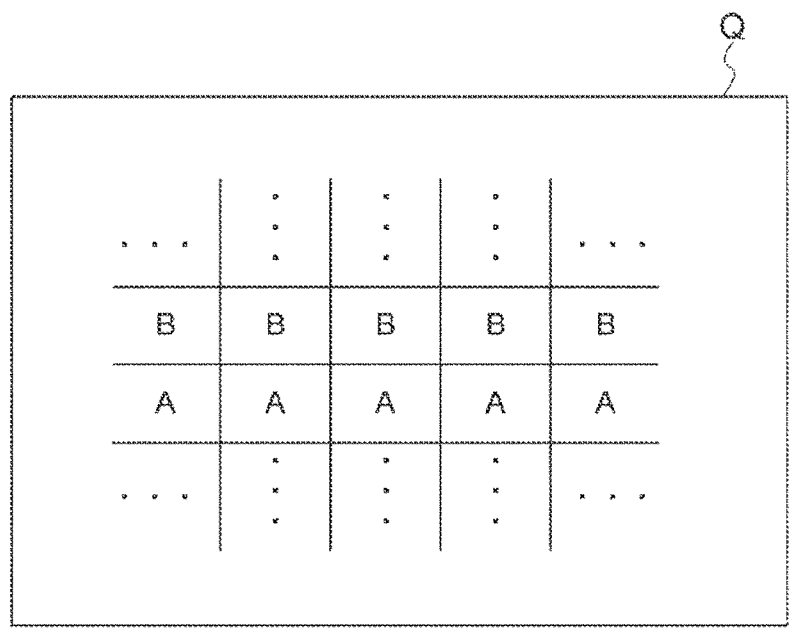
FIGS. 21A and 21B are explanatory diagrams illustrating a state of switching the VSL switches and outputting a pixel signal of a pixel in the A system to some output of the B system.
Figure 21B:
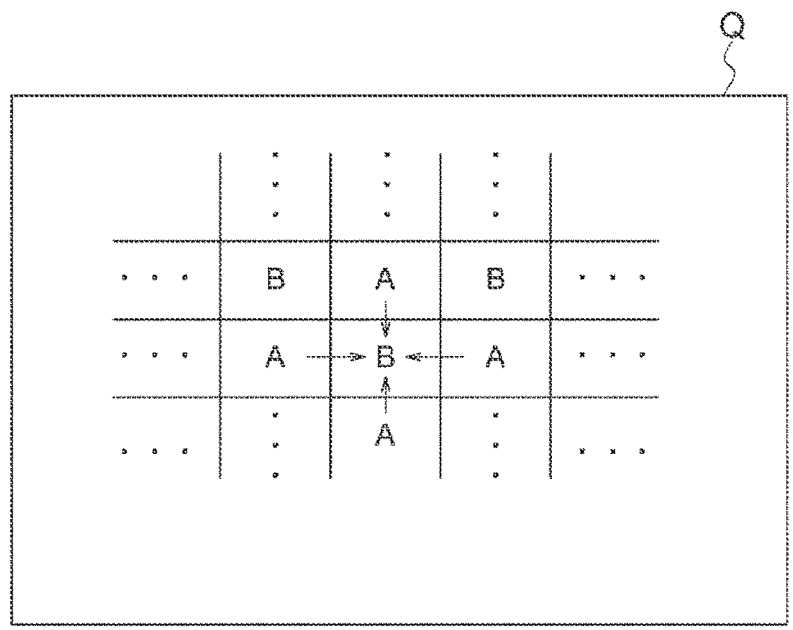

FIGS. 21A and 21B illustrate a concept of outputting pixel signals of pixels of one system while being outputting pixel signals of the other system of two systems. FIGS. 21A and 21B are explanatory diagrams illustrating a case in which the pixel signals of the pixels of a certain row of the B system is being output, the VSL switches SW1 to SW8 are switched to partially output pixel signals of pixels of the A system.

FIG. 21A illustrates a case where the pixel signals of the pixels of the A system and the B system are output for each row in the overlapping region Q in FIG. 20. Meanwhile, in FIG. 21B, the pixel signal of the pixel of the A system is output to part of the pixel signals of the pixels of the B system, and the pixel signal of the pixel of the B system is interpolated in the output signal of the A system.

As described above, the solid-state imaging device according to the fourth embodiment of the present technology can alternately output the pixel signals of the pixels of the A system and the B system for each row by using the VSL switches SW1 to SW8. Furthermore, the solid-state imaging device according to the fourth embodiment of the present technology can interpolate the pixel signals of adjacent pixels by switching the VSL switches SW1 to SW8, thereby improving the resolution.

6. Fifth Embodiment (Example 5 of Solid-State Imaging Device)

In a solid-state imaging device according to a fifth embodiment of the present technology, a control unit switches a switch to output a pixel signal of a pixel corresponding to first control by a control signal for performing the first control, or output a pixel signal of a pixel corresponding to second control by a control signal for performing the second control, among pixels corresponding to both control of the first control and the second control, in the solid-state imaging device according to the fourth embodiment. Note that the same configuration as that of the fifth embodiment is denoted by the same reference numeral, and description is omitted as appropriate.

Figure 22:
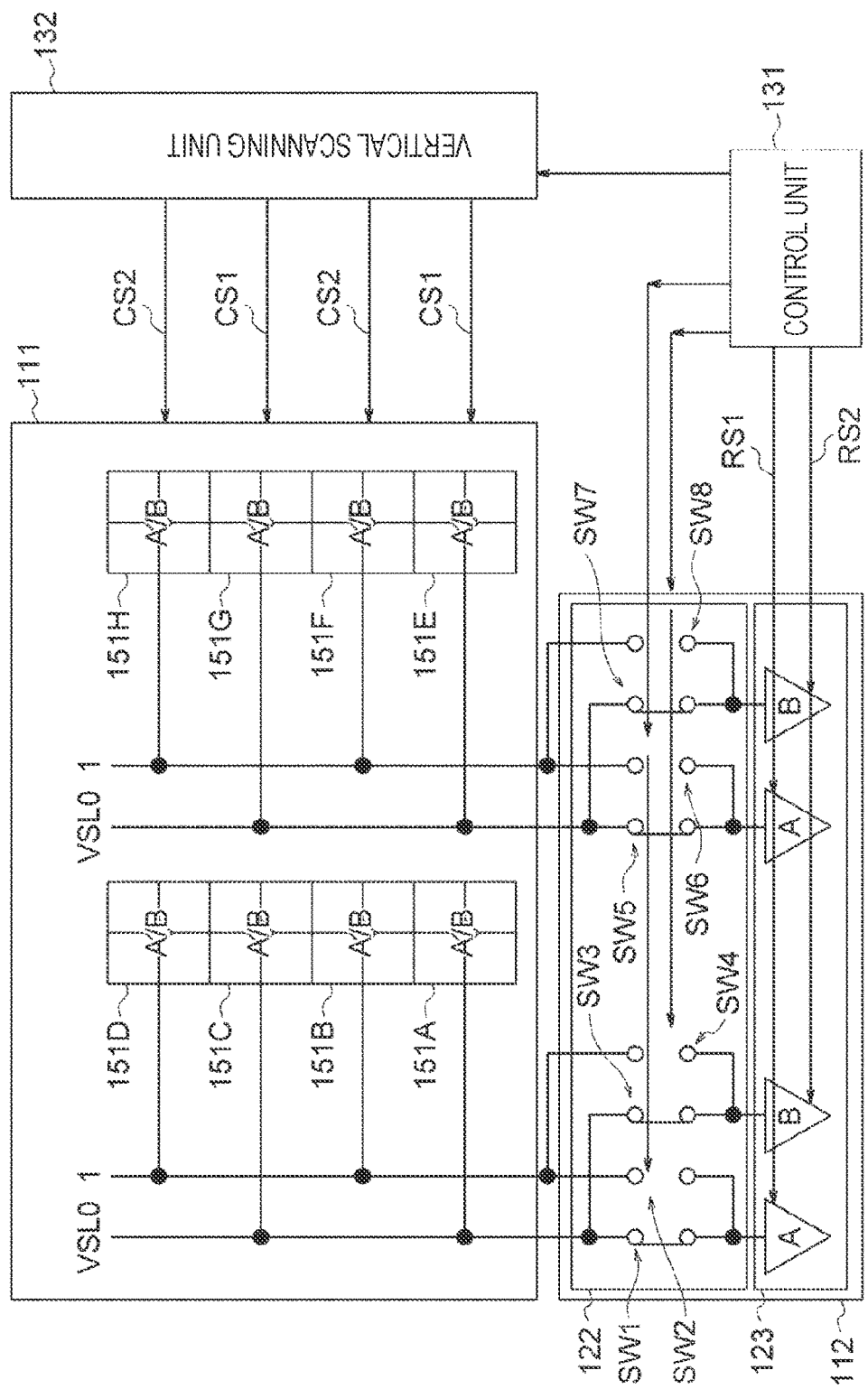
FIG. 22 is an explanatory diagram illustrating a state in which a control unit can switch the VSL switches to output the same pixel of both the A system and the B system.

FIG. 22 illustrates a concept of outputting pixels corresponding to both the first control and the second control as pixel signals of pixels both of A system and B system. FIG. 22 is an explanatory diagram illustrating a state in which a control unit 131 switches VSL switches SW1 to SW8 to output pixel signals of the same pixels of both the A system and the B system.

Figure 23:
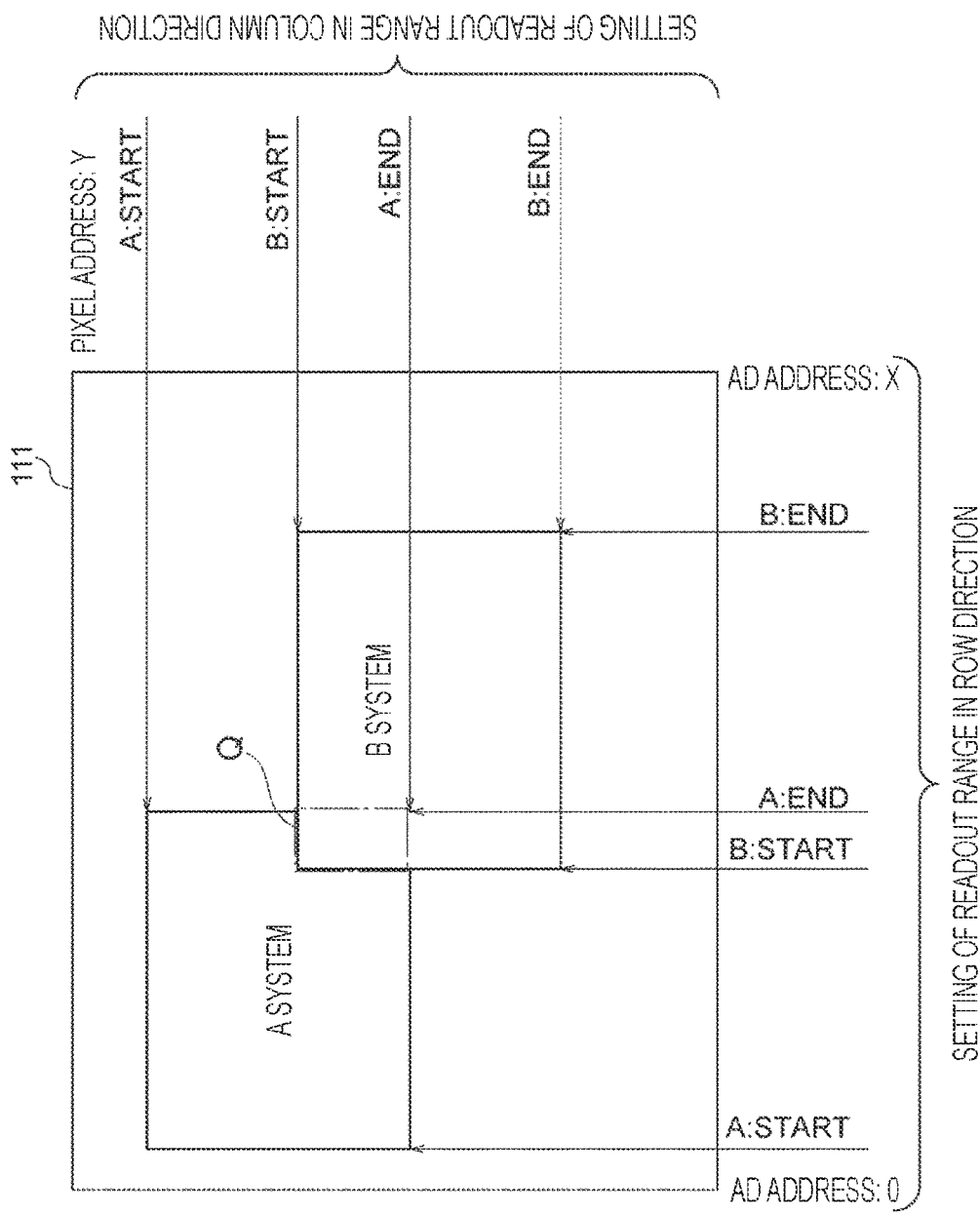
FIG. 23 is an explanatory diagram illustrating a state of outputting pixel signals of the same pixels of both the A system and the B system.

FIG. 23 illustrates a concept in which a pixel array unit 111 can read pixel signals of the same pixels both of the A system and the B system. FIG. 23 is an explanatory diagram illustrating a state of outputting the pixel signals of the same pixels of both the A system and the B system. In the case in FIG. 23, in a region Q where the A system and the B system overlap, the pixel signals of the pixels of the A system and the pixel signals of the pixels of the B system can be output.

Figure 24:
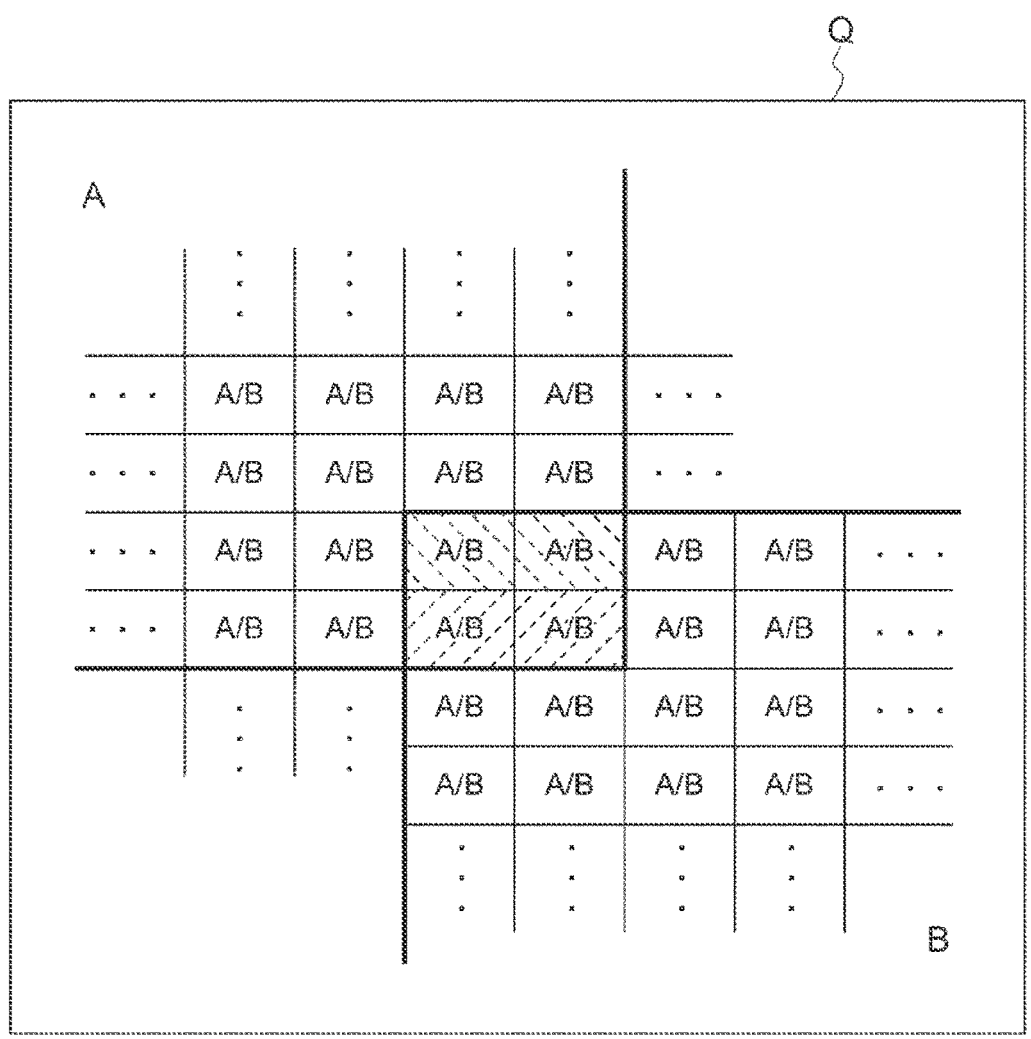
FIG. 24 is an explanatory diagram illustrating a state in which the control unit can switch the VSL switches to output the pixel signals of the same pixels of both the A system and the B system.

Furthermore, FIG. 24 illustrates a concept of outputting the pixels of the pixel signals both of the A system and the B system. FIG. 24 is an explanatory diagram illustrating a state in which the control unit 131 switches the VSL switches SW1 to SW8 to output pixel signals of the same pixels of both the A system and the B system.

As illustrated in FIG. 24, a region of the A system and a region of the B system can output the pixel signals of the same pixels both as the A system and the B system. Note that, in this case, the same pixels are output and thus accumulation times need to match. Furthermore, in the region Q where the region of the A system and the region of the B system overlap, the pixel signals can be output as both the A system and the B system. Note that, in the fifth embodiment, a frame rate decreases because the number of outputting pixel signals increases.

7. Sixth Embodiment (Example 6 of Solid-State Imaging Device)

In a solid-state imaging device according to a sixth embodiment of the present technology, a plurality of column A/D conversion units is further included, and a control unit can set a standby mode of not allowing conversion into a digital signal, for at least some of the plurality of column A/D conversion units, in association with some of a plurality of regions, in the solid-state imaging device according to the first embodiment. Note that the same configuration as that of the solid-state imaging device 100 in the first embodiment is denoted by the same reference numeral, and description is omitted as appropriate.

Figure 25:
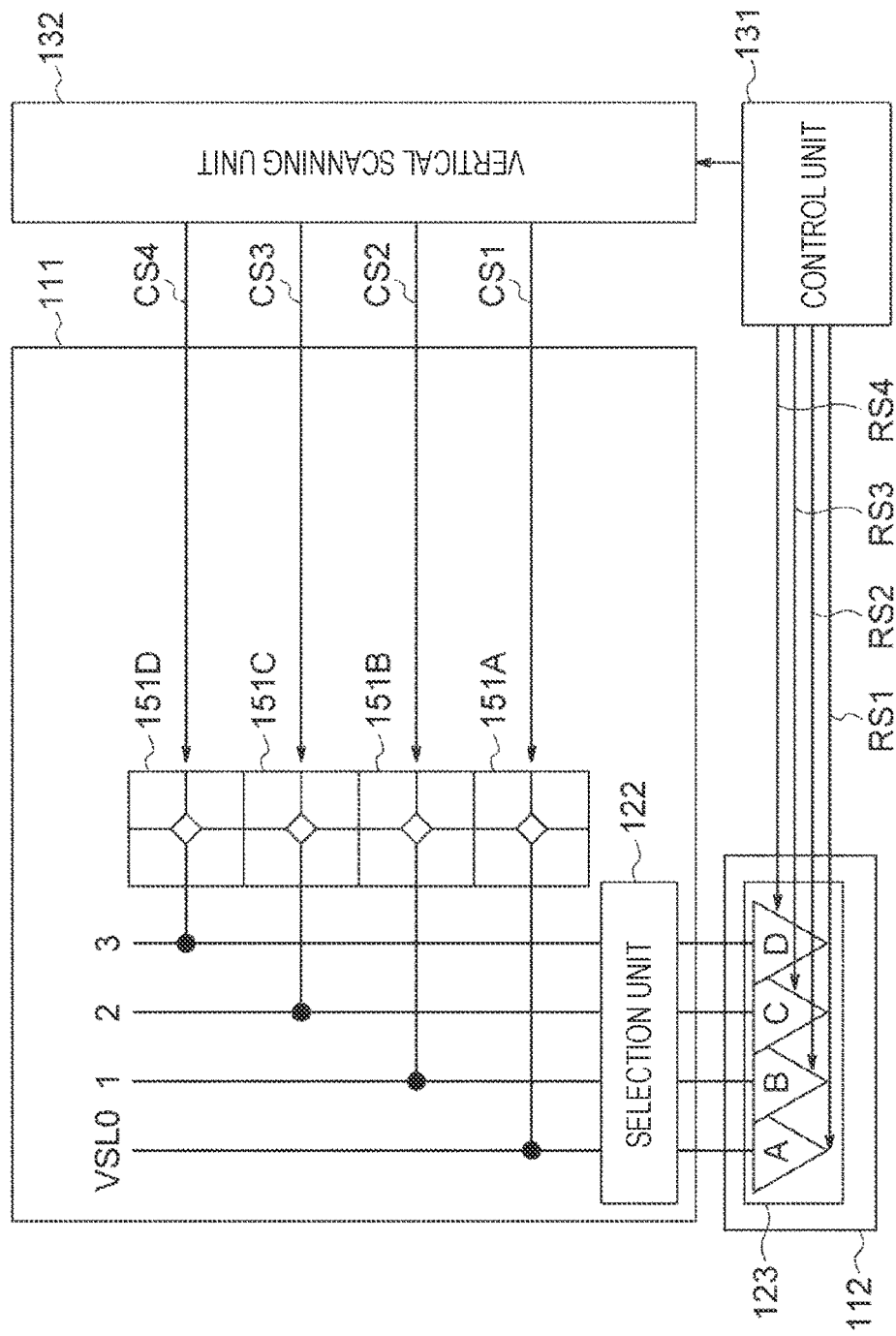
FIG. 25 is an explanatory diagram illustrating a state of setting a standby mode in the column A/D conversion unit.

FIG. 25 illustrates a state in which a control unit 131 sets a standby mode of not allowing some of column A/D conversion units 123 to convert pixels signals into digital signals. FIG. 25 is an explanatory diagram illustrating a state of setting the standby mode in the column A/D conversion units 123.

A selection unit 122 includes VSL switches SW1 to SW4. Four vertical signal lines (VSL0, VLS1, VSL2, and VSL3) are connected to a column A/D conversion unit A, a column A/D conversion unit 123B, a column A/D conversion unit 123C, and a column A/D conversion unit 123D via VSL switches SW1 to SW4 in a constant manner.

The control unit 131 controls the column A/D conversion unit 123A by a control signal RS1 corresponding to a pixel control signal CS1. Furthermore, the control unit 131 controls the column A/D conversion unit 123B by a control signal RS2 corresponding to a pixel control signal CS2. Furthermore, the control unit 131 controls the column A/D conversion unit 123C by a control signal RS3 corresponding to a pixel control signal CS3. Furthermore, the control unit 131 controls the column A/D conversion unit 123D by a control signal RS4 corresponding to a pixel control signal CS4.

Here, in the solid-state imaging device according to the sixth embodiment, the control unit 131 sets the standby mode of not allowing conversion into a digital signal, for at least some of the plurality of column A/D conversion units 123, in association with some of a plurality of regions.

Figure 26:
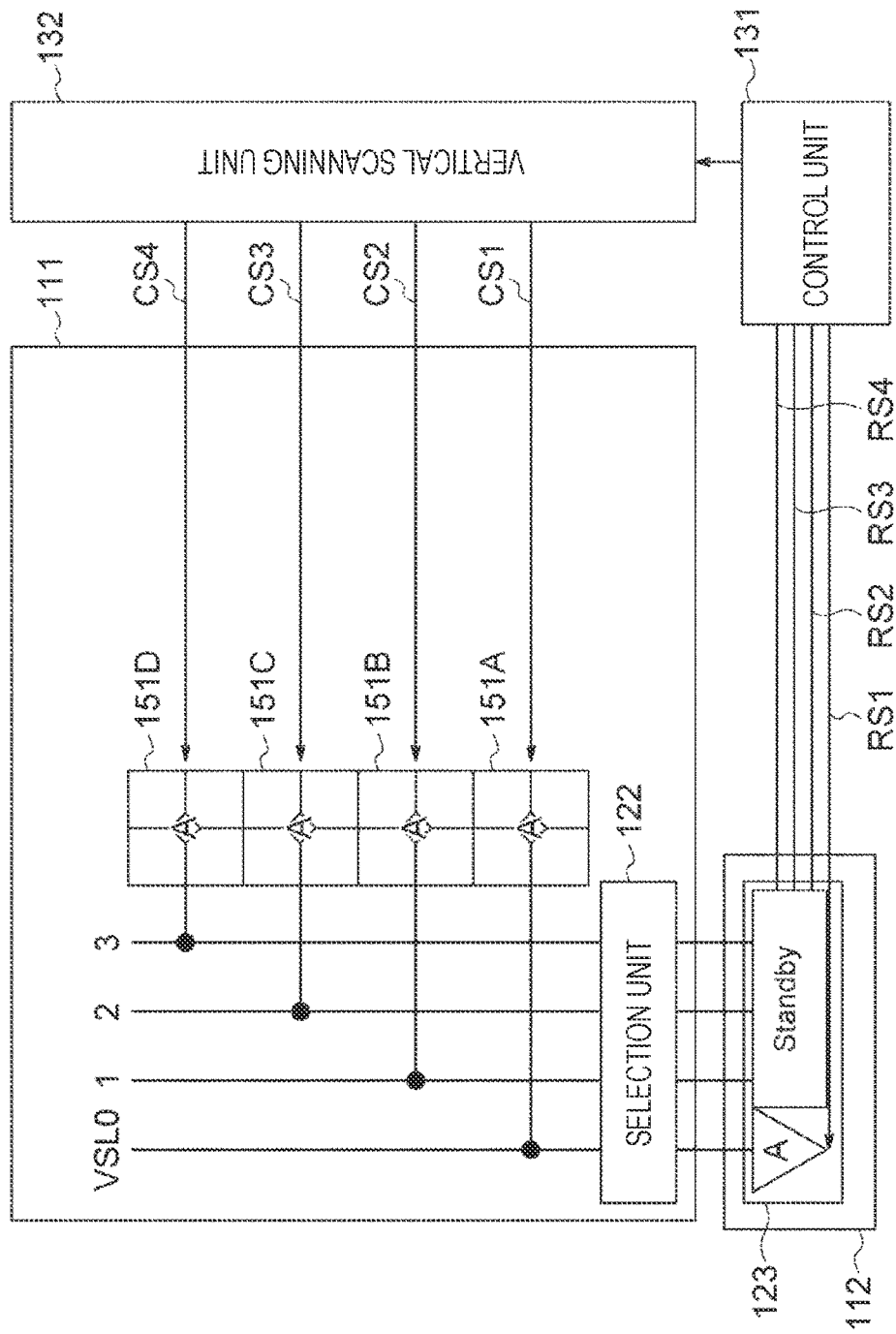
FIG. 26 is an explanatory diagram illustrating a state of setting the standby mode of not allowing some column A/D conversion unit to perform digital conversion processing.

FIG. 26 illustrates an example in which the control unit 131 sets only the column A/D conversion unit 123A among the plurality of column A/D conversion units 123 to be enabled to convert pixel signals into digital signals. FIG. 26 is an explanatory diagram illustrating that the column A/D conversion unit 123B, the column A/D conversion unit 123C, and the column A/D conversion unit 123D are set to the standby mode of not performing processing of converting pixel signals into digital signals.

In this case, in the column A/D conversion unit 123, only the column A/D conversion unit 123A can execute digital conversion processing. On the other hand, the column A/D conversion unit 123B, the column A/D conversion unit 123C, and the column A/D conversion unit 123D cannot perform the digital conversion processing, so all the signals supposed to be output from the column A/D conversion unit 123B, the column A/D conversion unit 123C, and column A/D conversion unit 123D are output from the column A/D conversion unit 123A.

Figure 27:
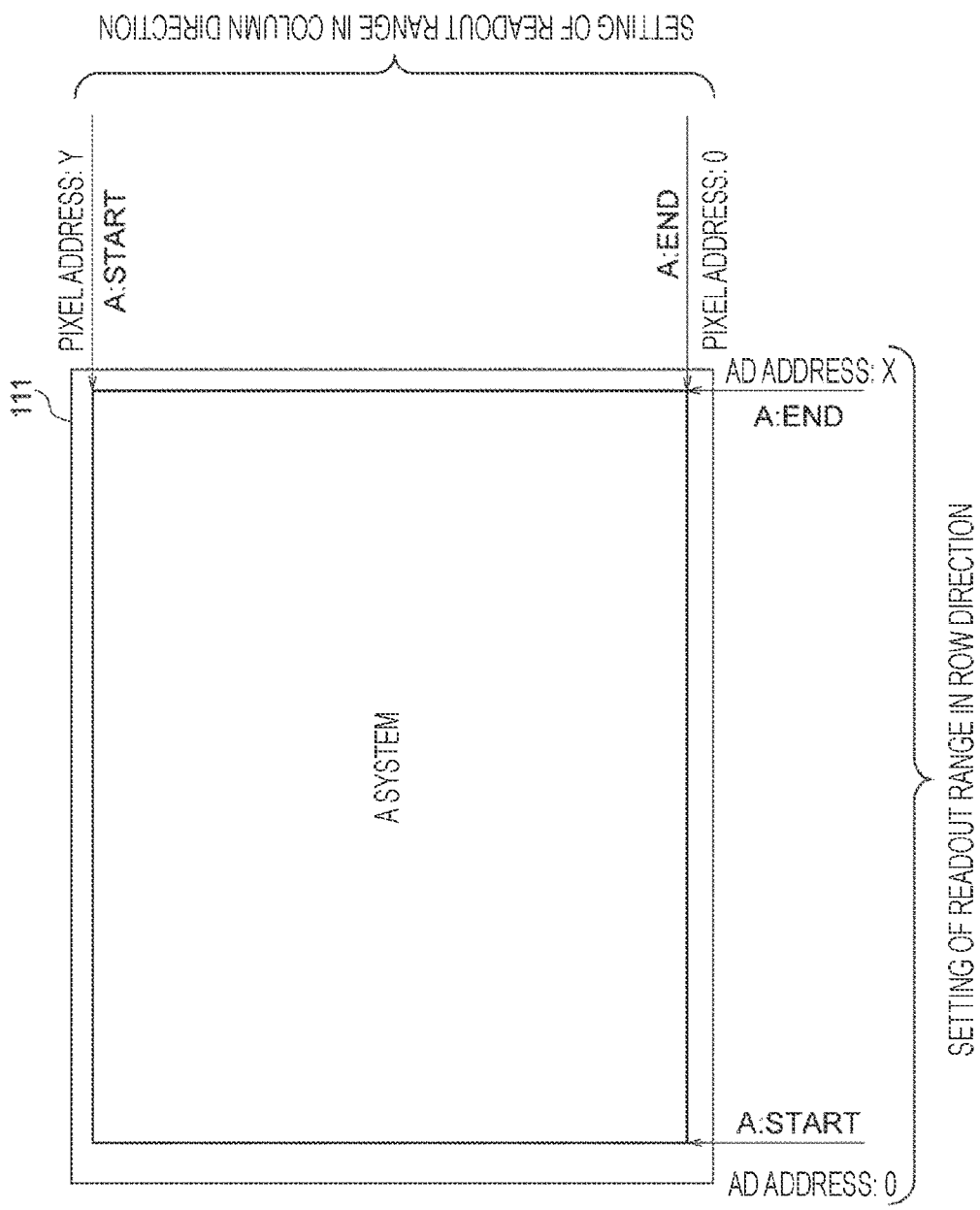
FIG. 27 is an explanatory diagram illustrating a state of outputting pixel signals of pixels only in the A system.

FIG. 27 illustrates a concept of outputting pixel signals of pixels from the column A/D conversion unit 123A as the A system in a pixel array unit 111. FIG. 27 is an explanatory diagram illustrating a state of outputting pixel signals of pixels only in the A system. In this case, the control unit 131 sets long time as accumulation time of the A system, for example, and also sets a gain of the column A/D conversion unit 123A to be high.

Furthermore, the control unit 131 sets a range of outputting pixel signals from START of AD address A to END of the AD address A in a row direction, as a region of the A system. Furthermore, the control unit 131 sets a range of outputting the pixel signals from START of pixel address A to END of the pixel address A in the column direction. As a result, the control unit 131 can output the pixel signals of the pixels in the region of the A system from the column A/D conversion unit 123A. Furthermore, since the column A/D conversion unit 123B corresponding to a region of the B system, the column A/D conversion unit 123C corresponding to a region of the C system, and the column A/D conversion unit 123D corresponding to a region of the D system are in the standby mode, the solid-state imaging device 100 can suppress power consumption.

Furthermore, the control unit 131 can set the two column A/D conversion unit 123C and column A/D conversion unit 123D among the plurality of column A/D conversion units 123 to the standby mode of not allowing conversion into digital signals.

Figure 28:
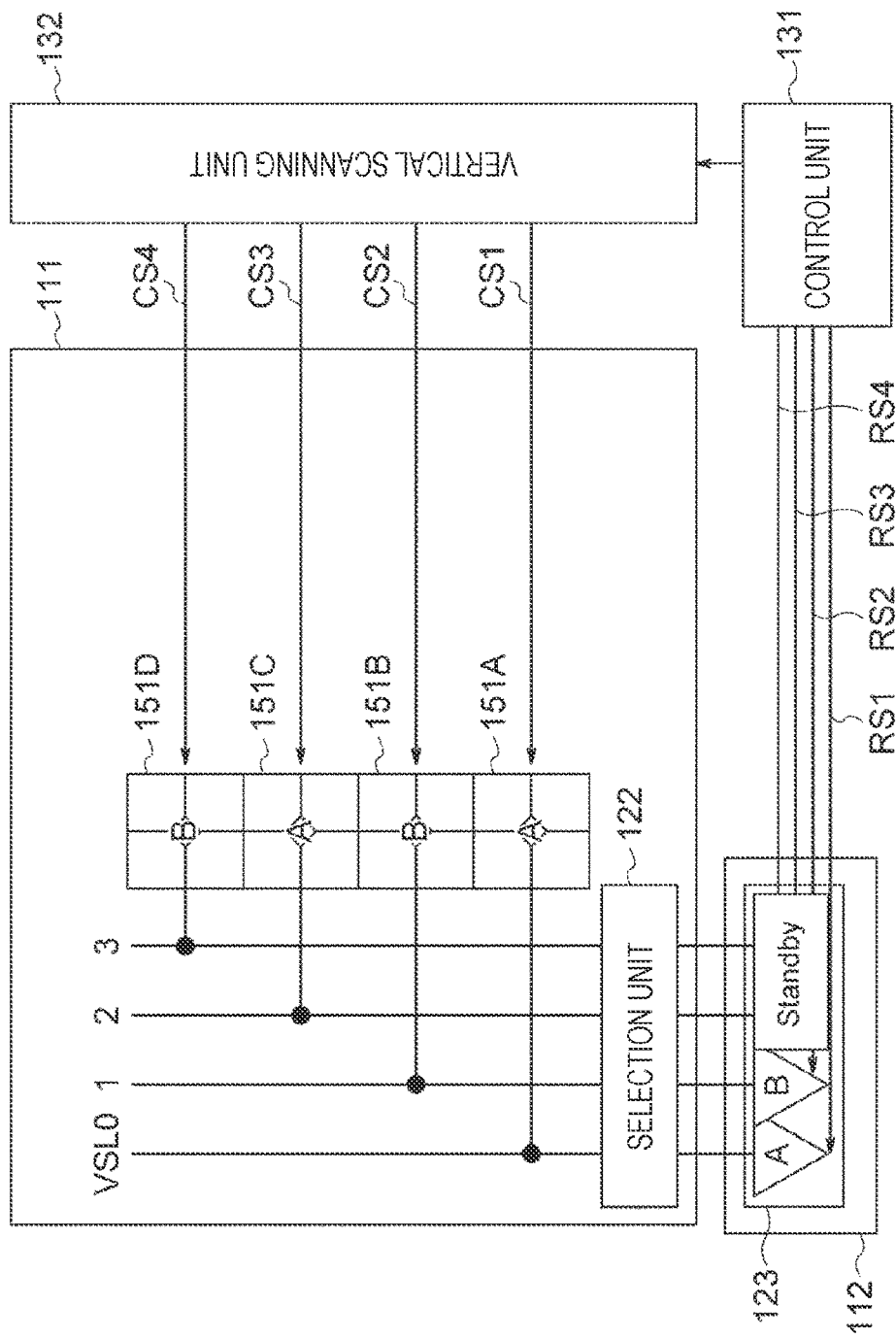
FIG. 28 is an explanatory diagram illustrating a state of setting the standby mode of not allowing digital conversion processing in two column A/D conversion units.

FIG. 28 illustrates a state in which the two column A/D conversion units 123A and 123B are enabled, and the other column A/D conversion units 123C and 123D are set to the standby mode. FIG. 28 is an explanatory diagram illustrating the state in which the standby mode of not allowing digital conversion processing is set for the column A/D conversion unit 123C and the column A/D conversion unit 123D.

The selection unit 122 always connects the vertical signal line VSL0 or the vertical signal line VSL2 to the column A/D conversion unit 123A, and always connects the vertical signal line VSL1 or the vertical signal line VSL3 to the column A/D conversion unit 123B. Thereby, the pixel array unit 111 can output pixel signals of pixels from the column A/D conversion unit 123A and the column A/D conversion unit 123B.

Figure 29:
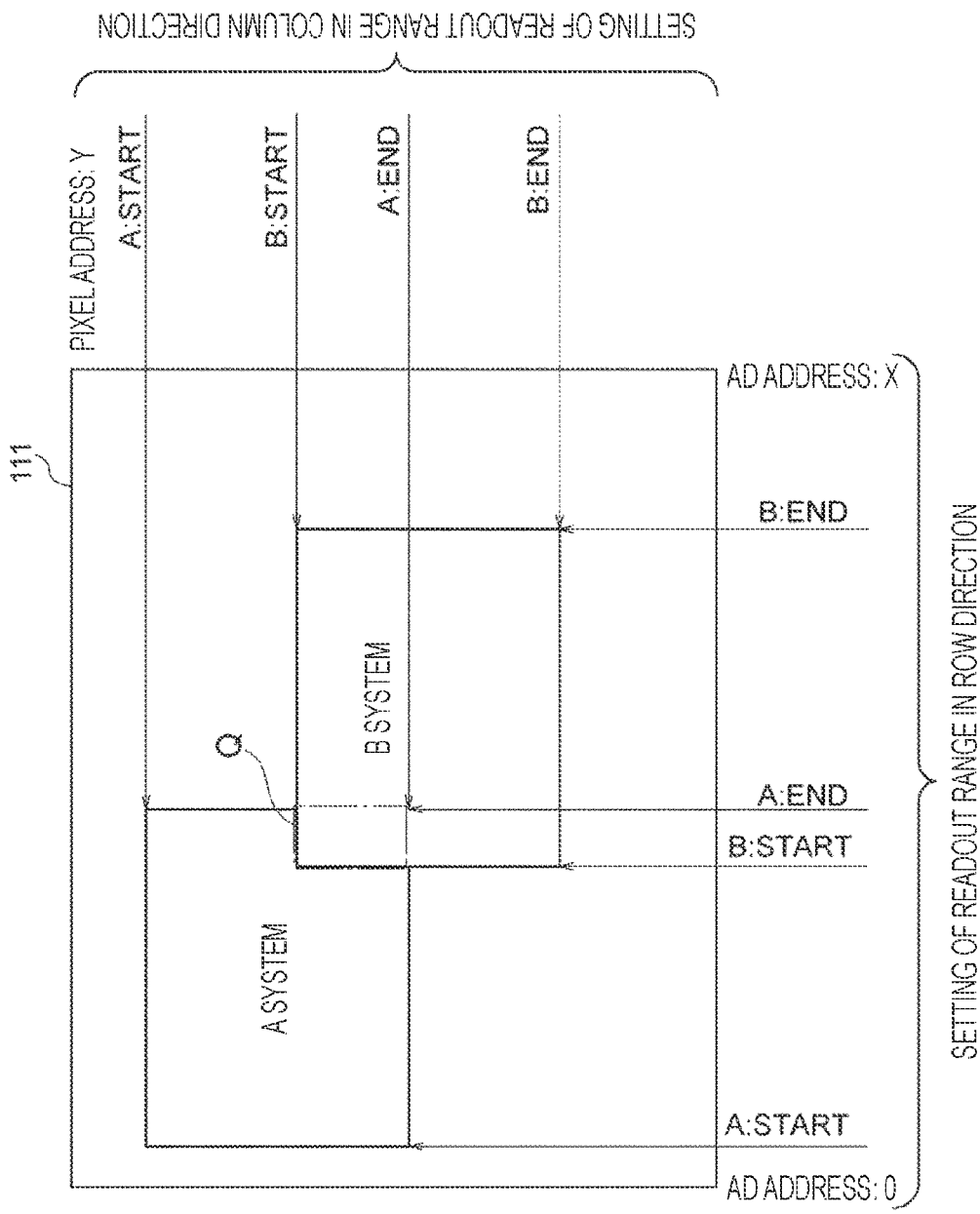
FIG. 29 is an explanatory diagram illustrating a state of outputting pixel signals of pixels from two column A/D conversion units.

FIG. 29 illustrates a concept of outputting pixel signals of pixels from the column A/D conversion unit 123A and the column A/D conversion unit 123B in the A system and the B system in the pixel array unit 111. FIG. 29 is an explanatory diagram illustrating a state in which pixel signals of pixels are output from the column A/D conversion unit 123A and the column A/D conversion unit 123B.

In this case, the column A/D conversion unit 123 can output the pixel signals of the pixels of the A system with the gain of the column A/D conversion unit 123A and can output the pixel signals of the pixels of the B system with the gain of the column A/D conversion unit 123B. Since the column A/D conversion unit 123C corresponding to the region of the C system and the column A/D conversion unit 123D corresponding to the region of the D system are in the standby mode, the solid-state imaging device 100 can suppress power consumption.

8. Seventh Embodiment Regarding Electronic Device

An electronic device according to a seventh embodiment of the present technology is an electronic device in which a solid-state imaging device is mounted, the solid-state imaging device including a pixel array in which a plurality of pixels is two-dimensionally arrayed in a row direction and a column direction, a control unit configured to set a range to output pixel signals of the plurality of pixels in the pixel array to each of the row direction and the column direction, a vertical scanning unit configured to output the pixel signals of the plurality of pixels in the range in the column direction set by the control unit, for each row and in the column direction, and a column A/D converter configured to convert the pixel signals of the plurality of pixels in the range in the row direction set by the control unit from analog signals into digital signals, for each column and in the row direction. Furthermore, the electronic device according to the seventh embodiment of the present technology may be an electronic device equipped with any one of the solid-state imaging devices according to the first to sixth embodiments of the present technology.

Figure 30:
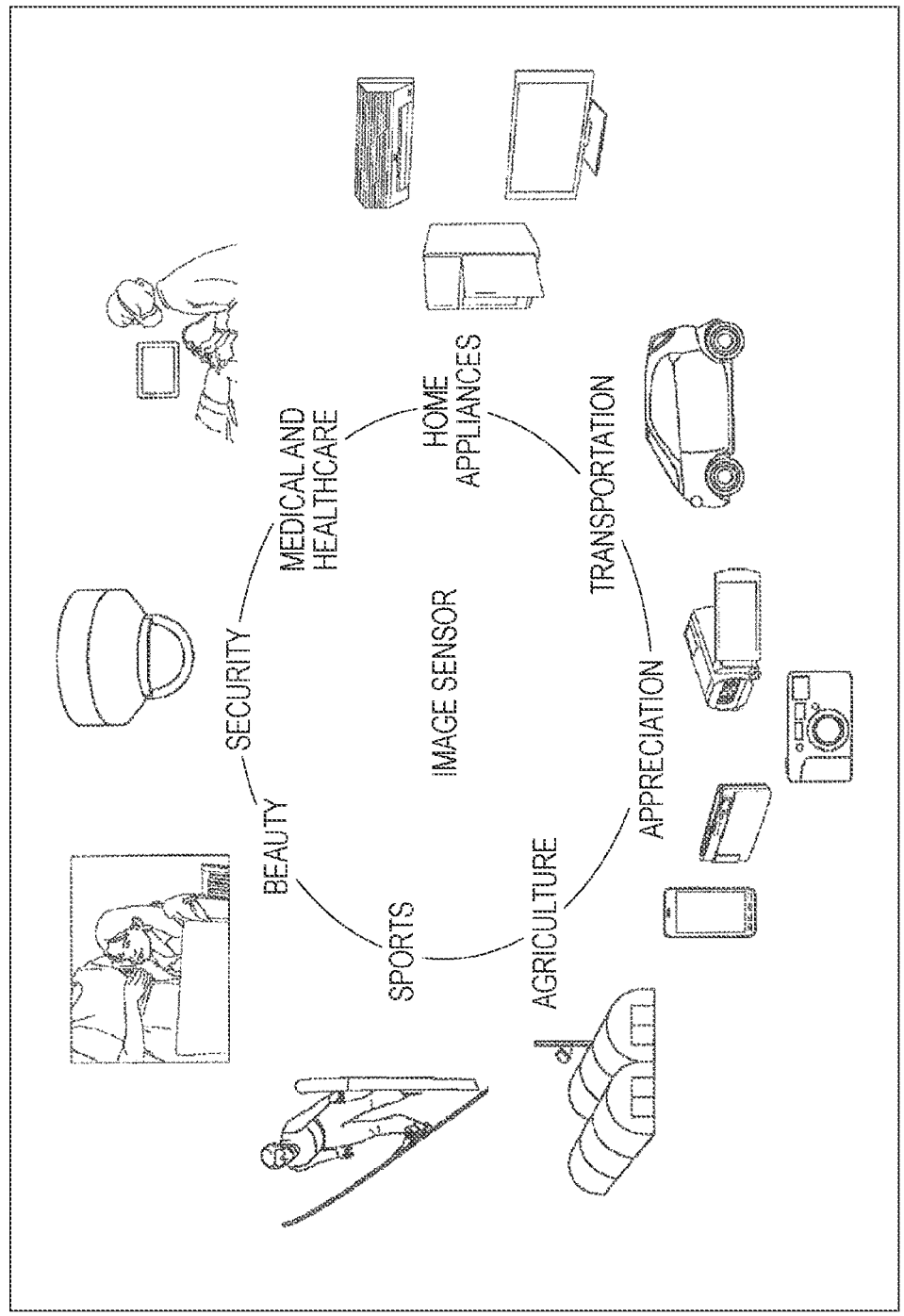
FIG. 30 is a diagram illustrating use examples of the solid-state imaging device of the first to sixth embodiments to which the present technology is applied.

9. Use Example of Solid-State Imaging Device to which Present Technology is Applied FIG. 30 is a diagram illustrating use examples of one of the solid-state imaging devices according to the first to sixth embodiments of the present technology as an image sensor.

The above-described solid-state imaging devices according to the first to sixth embodiments can be used in various cases for sensing light such as visible light, infrared light, ultraviolet light, and X-ray, as will be described below, for example. That is, as illustrated in FIG. 30, one of the solid-state imaging devices according to the first to sixth embodiments can be used as a device (for example, as the electronic device according to the fifth embodiment) in the field of appreciation in which images to be provided for use in appreciation are captured, in the field of transportation, the field of home appliances, the field of medical and healthcare, the field of security, the field of beauty, the field of sports, or the field of agriculture, for example.

Specifically, in the field of appreciation, one of the solid-state imaging devices according to the first to sixth embodiments can be used as a device for capturing an image to be provided for appreciation, such as a digital camera, a smart phone, or a mobile phone device having a camera function, for example.

In the field of transportation, one of the solid-state imaging devices according to the first to sixth embodiments can be used as a device provided for use in traffic, such as an in-vehicle sensor that captures the front, rear, surroundings, and an interior of the vehicle for safe driving such as automatic stop, recognition of a driver's state, a monitoring camera that monitors traveling vehicles and roads, or a distance measuring sensor that measures a distance between vehicles, for example.

In the field of home appliances, one of the solid-state imaging devices according to the first to sixth embodiments can be used as a device provided for home appliances such as a TV receiver, a refrigerator, or an air conditioner, for capturing a gesture of a user and performing a device operation according to the gesture, for example.

In the field of medical and healthcare, one of the solid-state imaging devices according to the first to sixth embodiments can be used as a device provided for use in medical and healthcare, such as an endoscope or a device that performs angiography by receiving infrared light, for example.

In the field of security, one of the solid-state imaging devices according to the first to sixth embodiments can be used as a device provided for use in security, such as a monitoring camera for crime prevention or a camera for person authentication use, for example.

In the field of beauty, for example, one of the solid-state imaging devices according to the first to sixth embodiments can be used as a device provided for use in beauty, such as a skin measuring instrument that captures skin or a microscope that captures scalp, for example.

In the field of sports, one of the solid-state imaging devices according to the first to sixth embodiments can be used as a device provided for use in sports, such as an action camera or a wearable camera for sport use, for example.

In the field of agriculture, one of the solid-state imaging devices according to the first to sixth embodiments can be used as a device provided for use in agriculture, such as a camera for monitoring the condition of fields and crops, for example.

Figure 31:
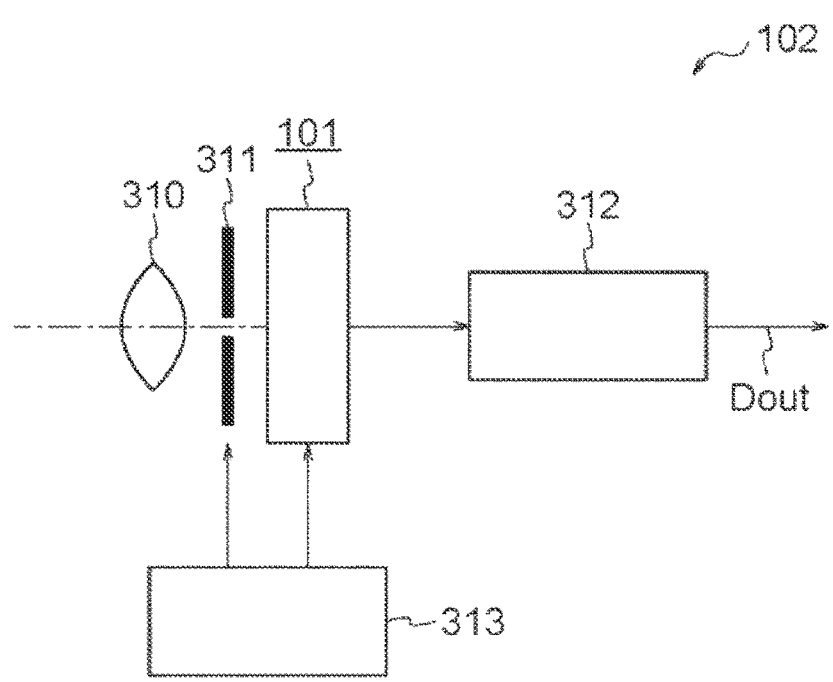
FIG. 31 is a functional block diagram of an example of an electronic device to which the present technology is applied.

Next, a specific use example of the solid-state imaging devices according to the first to sixth embodiments according of the present technology will be described. For example, the above-described solid-state imaging device 100 can be applied to every type of electronic device having an imaging function, such as a camera system of a digital still camera or a video camera, or a mobile phone having an imaging function. FIG. 31 illustrates a schematic configuration of an electronic device 102 (camera) as an example. The electronic device 102 is, for example, a video camera capable of capturing a still image or a moving image, and includes a solid-state imaging device 101, an optical system (optical lens) 310, a shutter device 311, and a drive unit 313 that drives the solid-state imaging device 101 and the shutter device 311, and a signal processing unit 312.

The optical system 310 guides image light (incident light) from an object to a pixel unit 101a of the solid-state imaging device 101. The optical system 310 may be configured by a plurality of optical lenses. The shutter device 311 controls a light irradiation period and a light shielding period for the solid-state imaging device 101. The drive unit 313 controls a transfer operation of the solid-state imaging device 101 and a shutter operation of the shutter device 311. The signal processing unit 312 performs various types of signal processing for a signal output from the solid-state imaging device 101. A video signal Dout after the signal processing is stored in a storage medium such as a memory or is output to a monitor or the like.

Note that embodiments of the present technology are not limited to the above-described embodiments, and various changes can be made without departing from the gist of the present technology.

Furthermore, the first to sixth embodiments of the present technology are not limited to the above-described embodiments, and various changes can be made without departing from the gist of the present technology.

Furthermore, the effects described in the present specification are merely examples and are not limited, and other effects may be exhibited.

Furthermore, the present technology can employ the following configurations.

(1) A solid-state imaging device including:
a pixel array in which a plurality of pixels is two-dimensionally arrayed in a row direction and a column direction;
a control unit configured to set a range to output pixel signals of the plurality of pixels in the pixel array to each of the row direction and the column direction;
a vertical scanning unit configured to output the pixel signals of the plurality of pixels in the range in the column direction set by the control unit, for each row and in the column direction; and
a column A/D converter configured to convert the pixel signals of the plurality of pixels in the range in the row direction set by the control unit from analog signals into digital signals, for each column and in the row direction.

(2) The solid-state imaging device according (1), in which
at least two or more control signals for outputting the pixel signals of the plurality of pixels are assigned for each row, and
the control unit
sets the range in the row direction and the range in the column direction to form a region, and
sets a plurality of the regions and assigns the control signals to the plurality of respective regions.

(3) The solid-state imaging device according (2), in which
the control unit
sets an accumulation time for accumulation for each of the plurality of regions.

(4) The solid-state imaging device according (3), in which
the control unit
sets the accumulation times set for the respective regions of the plurality of regions to be different from one another or to be same among the regions.

(5) The solid-state imaging device according any one of (2) to (4), in which
the control unit
controls the two or more control signals to simultaneously output the pixel signals of the plurality of pixels corresponding to the two or more control signals in the range in the column direction set by the control unit.

(6) The solid-state imaging device according any one of (2) to (5), in which
the control unit
sets the plurality of regions independently of one another.
(7) The solid-state imaging device according any one of (2) to (6), in which a signal line for transmitting the control signal is connected to at least a reset transistor, an amplification transistor, and a select transistor.
(8) The solid-state imaging device according any one of (2) to (7), further including: a switch configured to switch, for the each control signal, the pixel signals of the plurality of pixels output from the pixel array.
(9) The solid-state imaging device according to (8), further including:
a selection unit configured to select a signal line for supplying the pixel signals of the plurality of pixels to the column/AD conversion unit, in which
the selection unit includes the switch, and
switches, for the each control signal, the pixel signals of the plurality of pixels output from the pixel array.
(10) The solid-state imaging device according (8) or (9), in which
the control unit switches the switch to
cause a first A/D converter to convert the pixel signals of the pixels corresponding to first control for controlling at least some even rows into digital signals and cause a second A/D converter to convert the pixel signals of the pixels corresponding to second control for controlling at least some odd rows into digital signals, and cause the first A/D converter and the second A/D converter to output the pixel signals of the pixels, respectively, and
next, cause the second A/D converter to convert the pixel signals of the pixels corresponding to the first control into digital signals and cause the first A/D converter to convert the pixel signals of the pixels corresponding to the second control into digital signals, and cause the first A/D converter and the second A/D converter to output the pixel signals of the pixels, respectively.
(11) The solid-state imaging device according to (10), in which
the control unit switches the switch to
output the pixel signal of the pixel corresponding to the first control by the control signal for performing the first control, or output the pixel signal of the pixel corresponding to the second control by the control signal for performing the second control, from among the pixels corresponding to both control of the first control and the second control.
(12) The solid-state imaging device according any one of (2) to (11), further including:
a plurality of the column A/D conversion units, in which
the control unit
sets a standby mode of not allowing conversion into the digital signal, for at least some of the plurality of column A/D conversion units in association with some of the plurality of regions.
(13) The solid-state imaging device according any one of (2) to (12), in which
the control unit
sets, for the each control signal, a gain that amplifies the digital signal converted by the column A/D converter.
(14) An electronic device including: the solid-state imaging device according to any one of (1) to (13).

REFERENCE SIGNS LIST

100 Solid-state imaging device
111 Pixel array unit
112, 112A, 112B Readout unit
113, 113A, 113B, 113C, and 113D D/A conversion unit
121 Column pixel unit
122, 122A, and 122B Selection unit
123, 123A, and 123B Column A/D conversion unit
124, 124A, and 124B Horizontal transfer unit
131 Control unit
132 Vertical scanning unit
133 Horizontal scanning unit
141 Address decoder
142 Pixel drive unit 142
151, 151A, 151B, 151C, and 151D Unit pixel
151E, 151F, 151G, 151H Unit pixel

The invention claimed is:

1. A solid-state imaging device, comprising:
a pixel array that includes a plurality of pixels two-dimensionally arrayed in a row direction and a column direction;
a control circuit configured to:
set, in each of the row direction and the column direction, a range for output of a first plurality of pixel signals of the plurality of pixels in the pixel array;
set a plurality of regions in the pixel array, wherein a region of the plurality of regions corresponds to the range set in each of the row direction and the column direction;
assign a plurality of control signals to the plurality of regions, wherein at least two control signals of the plurality of control signals correspond to a first set of pixels of the plurality of pixels in the plurality of regions; and
control the at least two control signals to simultaneously output a second plurality of pixel signals of the first set of pixels in the range set in the column direction;
a specific switch configured to switch, for each control signal of the plurality of control signals, the first plurality of pixel signals of the plurality of pixels output from the pixel array;
a vertical scanning unit configured to output, for each row of a plurality of rows of the pixel array, the first plurality of pixel signals of the plurality of pixels in the range set in the column direction; and
a column A/D converter configured to convert, for each column of a plurality of columns of the pixel array, the first plurality of pixel signals of the plurality of pixels in the range set in the row direction into a first plurality of digital signals,
wherein the control circuit is further configured to control the specific switch to:
control a first A/D converter to convert a third plurality of pixel signals of a second set of pixels of the plurality of pixels into a second plurality of digital signals, wherein the second set of pixels is in even rows of the plurality of rows;
control a second A/D converter to convert a fourth plurality of pixel signals of a third set of pixels of the plurality of pixels into a third plurality of digital signals, wherein the third set of pixels is in odd rows of the plurality of rows;
control the first A/D converter to output the second plurality of digital signals;
control the second A/D converter to output the third plurality of digital signals;
control, subsequent to the output of the third plurality of digital signals, the second A/D converter to convert the third plurality of pixel signals of the second set of pixels into a fourth plurality of digital signals;

control, subsequent to the output of the third plurality of digital signals, the first A/D converter to convert the fourth plurality of pixel signals of the third set of pixels into a fifth plurality of digital signals;

control the first A/D converter to output the fifth plurality of digital signals; and control the second A/D converter to output the fourth plurality of digital signals.

2. The solid-state imaging device according to claim 1, wherein the control circuit is further configured to set an accumulation time for accumulation of a charge for each of the plurality of regions.

3. The solid-state imaging device according to claim 2, wherein the accumulation time set for a first region of the plurality of regions is different from the accumulation time set for a second region of the plurality of regions.

4. The solid-state imaging device according to claim 1, wherein the control circuit is further configured to set the plurality of regions independently of one another.

5. The solid-state imaging device according to claim 1, wherein
each pixel of the plurality of pixels includes a reset transistor, an amplification transistor, and a select transistor, and
a signal line for transmission of a control signal of the plurality of control signals is connected to the reset transistor, the amplification transistor, and the select transistor.

6. The solid-state imaging device according to claim 1, further comprising a selection circuit configured to:
select a signal line to supply the first plurality of pixel signals of the plurality of pixels to the column A/D converter, wherein the selection circuit includes the specific switch; and
switch, for each control signal of the plurality of control signals, the first plurality of pixel signals of the plurality of pixels output from the pixel array.

7. The solid-state imaging device according to claim 1, wherein
the control circuit is further configured to control the specific switch to output a pixel signal of the second plurality of pixel signals of the first set of pixels,
the first set of pixels corresponds to each of a first region of the plurality of regions and a second region of the plurality of regions,
a first control signal of the plurality of control signals is assigned to the first region, and
a second control signal of the plurality of control signals is assigned to the second region.

8. The solid-state imaging device according to claim 1, further comprising a plurality of column A/D converters that includes the column A/D converter, wherein
the control circuit is further configured to set a standby mode of a set of column A/D converters of the plurality of column A/D converters, to restrict the conversion of the first plurality of pixel signals into the first plurality of digital signals, and
the set of column A/D converters is associated with a set of regions of the plurality of regions.

9. The solid-state imaging device according to claim 1, wherein the control circuit is further configured to set, for each control signal of the plurality of control signals, a gain that amplifies the first plurality of digital signals.

10. An electronic device, comprising:
a solid-state imaging device that includes:
a pixel array that includes a plurality of pixels two-dimensionally arrayed in a row direction and a column direction;
a control circuit configured to:
set, in each of the row direction and the column direction, a range for output of a first plurality of pixel signals of the plurality of pixels in the pixel array;
set a plurality of regions in the pixel array, wherein a region of the plurality of regions corresponds to the range set in each of the row direction and the column direction;
assign a plurality of control signals to the plurality of regions, wherein at least two control signals of the plurality of control signals correspond to a first set of pixels of the plurality of pixels in the plurality of regions; and
control the at least two control signals to simultaneously output a second plurality of pixel signals of the first set of pixels in the range set in the column direction;
a specific switch configured to switch, for each control signal of the plurality of control signals, the first plurality of pixel signals of the plurality of pixels output from the pixel array;
a vertical scanning unit configured to output, for each row of a plurality of rows of the pixel array, the first plurality of pixel signals of the plurality of pixels in the range set in the column direction; and
a column A/D converter configured to convert, for each column of a plurality of columns of the pixel array, the first plurality of pixel signals of the plurality of pixels in the range set in the row direction into a first plurality of digital signals,
wherein the control circuit is further configured to control the specific switch to:
control a first A/D converter to convert a third plurality of pixel signals of a second set of pixels of the plurality of pixels into a second plurality of digital signals, wherein the second set of pixels is in even rows of the plurality of rows;
control a second A/D converter to convert a fourth plurality of pixel signals of a third set of pixels of the plurality of pixels into a third plurality of digital signals, wherein the third set of pixels is in odd rows of the plurality of rows;
control the first A/D converter to output the second plurality of digital signals;
control the second A/D converter to output the third plurality of digital signals;
control, subsequent to the output of the third plurality of digital signals, the second A/D converter to convert the third plurality of pixel signals of the second set of pixels into a fourth plurality of digital signals;
control, subsequent to the output of the third plurality of digital signals, the first A/D converter to convert the fourth plurality of pixel signals of the third set of pixels into a fifth plurality of digital signals;
control the first A/D converter to output the fifth plurality of digital signals; and
control the second A/D converter to output the fourth plurality of digital signals.

11. A solid-state imaging device, comprising:
a pixel array that includes a plurality of pixels two-dimensionally arrayed in a row direction and a column direction;
a control circuit configured to:
  set, in each of the row direction and the column direction, a range for output of a first plurality of pixel signals of the plurality of pixels in the pixel array;
  set a plurality of regions in the pixel array, wherein a region of the plurality of regions corresponds to the range set in each of the row direction and the column direction; and
  assign a plurality of control signals to the plurality of regions;
a specific switch configured to switch, for each control signal of the plurality of control signals, the first plurality of pixel signals of the plurality of pixels in the pixel array;
a vertical scanning unit configured to output, for each row of a plurality of rows of the pixel array, the first plurality of pixel signals of the plurality of pixels in the range set in the column direction; and
a column A/D converter configured to convert, for each column of a plurality of columns of the pixel array, the first plurality of pixel signals of the plurality of pixels in the range set in the row direction into a first plurality of digital signals,
wherein the control circuit is further configured to control the specific switch to:
  control a first A/D converter to convert a second plurality of pixel signals of a first set of pixels of the plurality of pixels into a second plurality of digital signals, wherein the first set of pixels is in even rows of the plurality of rows;
  control a second A/D converter to convert a third plurality of pixel signals of a second set of pixels of the plurality of pixels into a third plurality of digital signals, wherein the second set of pixels is in odd rows of the plurality of rows;
  control the first A/D converter to output the second plurality of digital signals;
  control the second A/D converter to output the third plurality of digital signals;
  control, subsequent to the output of the third plurality of digital signals, the second A/D converter to convert the second plurality of pixel signals of the first set of pixels into a fourth plurality of digital signals;
  control, subsequent to the output of the third plurality of digital signals, the first A/D converter to convert the third plurality of pixel signals of the second set of pixels into a fifth plurality of digital signals;
  control the first A/D converter to output the fifth plurality of digital signals; and
  control the second A/D converter to output the fourth plurality of digital signals.

* * * * *